US012568475B2

(12) United States Patent
Sun

(10) Patent No.: US 12,568,475 B2
(45) Date of Patent: Mar. 3, 2026

(54) RESOURCE ALLOCATION METHOD AND APPARATUS

(71) Applicant: HUAWEI TECHNOLOGIES CO., LTD., Shenzhen (CN)

(72) Inventor: Huan Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 353 days.

(21) Appl. No.: 18/170,222

(22) Filed: Feb. 16, 2023

(65) Prior Publication Data

US 2023/0199734 A1 Jun. 22, 2023

Related U.S. Application Data

(63) Continuation of application No. PCT/CN2021/108671, filed on Jul. 27, 2021.

(30) Foreign Application Priority Data

Aug. 19, 2020 (CN) ......................... 202010839306.1

(51) Int. Cl.
*H04W 72/20* (2023.01)
*H04W 72/0446* (2023.01)
*H04W 72/23* (2023.01)

(52) U.S. Cl.
CPC ....... *H04W 72/0446* (2013.01); *H04W 72/23* (2023.01)

(58) Field of Classification Search
None
See application file for complete search history.

(56) References Cited

U.S. PATENT DOCUMENTS

2019/0230689 A1 7/2019 Cao et al.
2021/0302561 A1* 9/2021 Bayesteh ................ G01S 13/42
2021/0337617 A1* 10/2021 Bao ........................ H04W 72/21
2023/0146485 A1* 5/2023 Jian .................... H04B 7/15507 455/11.1
2023/0208479 A1* 6/2023 Wang .................. H04B 7/0617 375/262
2023/0246674 A1* 8/2023 Åström ............. H04B 7/04013 375/262
2023/0258759 A1* 8/2023 Wang .................... G01S 1/0423 455/456.1

FOREIGN PATENT DOCUMENTS

CN 111131096 A 5/2020
WO 2020022650 A1 1/2020
WO 2020145769 A1 7/2020

* cited by examiner

*Primary Examiner* — Duc T Duong
(74) *Attorney, Agent, or Firm* — Rimon PC

(57) ABSTRACT

Embodiments of this application provide resource allocation method and related apparatus, and generally relate to the communication field. An intelligent reflecting surface (IRS) array control parameter can be determined by using a flexible slot resource, and transmission of uplink data and downlink data are not affected. In the method, a terminal device obtains resource indication information, where the resource indication information indicates an uplink (UL) transmission resource and a downlink (DL) transmission resource in a flexible slot, and the flexible slot is used to determine an IRS array control parameter. The terminal device performs UL transmission and DL transmission based on the resource indication information.

20 Claims, 19 Drawing Sheets

RESOURCE ALLOCATION METHOD AND APPARATUS

CROSS-REFERENCE TO RELATED APPLICATIONS

This application is a continuation of International Patent Application No. PCT/CN2021/108671, filed on Jul. 27, 2021, which claims priority to Chinese Patent Application No. 202010839306.1, filed on Aug. 19, 2020. The disclosures of the aforementioned applications are hereby incorporated by reference in their entireties.

TECHNICAL FIELD

This application generally relates to the field of communication technologies, and in particular, to a resource allocation method and apparatus.

BACKGROUND

FIG. 1 shows a conventional multiple-input multiple-output (MIMO) system. In the MIMO system, a plurality of antennas are separately deployed at a transmitting end and a receiving end, thereby improving transmission performance of a communication system. For example, in diversity scenarios, a MIMO technology can effectively improve transmission reliability. In multiplexing scenarios, the MIMO technology can greatly increase a transmission throughput. However, because antennas deployed on a base station side is an active antenna array (AAA), a large amount of signal data needs to be processed, causing high power consumption on the base station side.

Based on this, as shown in FIG. 2, an electromagnetic super surface array, also referred to as an intelligent reflecting surface (IRS) array, is introduced into a conventional MIMO system to form a MIMO system with a novel architecture, and is referred to as an IRS-MIMO system. The IRS array controls only phases of an input signal and an output signal, does not actively transmit user data, and has low power consumption. Therefore, the IRS array may be considered as a passive array.

In a running process of the IRS-MIMO system, a channel needs to be designed by configuring a control parameter (for example, a phase parameter) of a reflection unit in the IRS array, to improve transmission efficiency. In a channel design process, a terminal side needs to measure downlink channel information and upload the downlink channel information to a base station, and the base station determines the control parameter of the reflection unit based on the downlink channel information. However, a large data amount of the downlink channel information in the IRS-MIMO system leads to a long measurement and feedback periodicity, and low channel design efficiency.

SUMMARY

Embodiments of this disclosure provide a resource allocation method and related apparatus, so that an intelligent reflecting surface (IRS) array control parameter can be determined by using a flexible slot resource, and transmission of uplink data and downlink data is not affected.

To achieve the foregoing objective, the following technical solutions are used in this disclosure.

According to a first aspect, this disclosure provides a resource allocation method. The method may be performed by a terminal device, or may be performed by a component (such as a chip system) in the terminal device. The method may include: the terminal device obtains resource indication information. The resource indication information indicates an uplink (UL) transmission resource and a downlink (DL) transmission resource in a flexible slot. The flexible slot is used to determine an intelligent reflecting surface IRS array control parameter. The terminal device performs UL transmission and DL transmission based on the resource indication information.

The IRS array control parameter includes, for example, a phase parameter of a reflection unit in an IRS array, and the IRS array reflects a received incident signal based on the control parameter.

In some embodiments, a network device configures resources in the flexible slot as an uplink transmission resource and a downlink transmission resource that are used to determine the IRS array control parameter. In the flexible slot, the network device determines the IRS array control parameter by interacting with the terminal device.

In this way, transmission of uplink data and downlink data is not affected in a process of determining the IRS array parameter by the network device. In addition, the IRS array parameter can be flexibly determined in the flexible slot, thereby improving channel design efficiency.

In a possible implementation, an uplink cascading channel and a downlink cascading channel between the terminal device and the network device have reciprocity, the resource indication information includes first indication information, and the first indication information includes first resource configuration information. The first resource configuration information is used to configure a first UL transmission resource and a first DL transmission resource. The first UL transmission resource includes a first time period, the first DL transmission resource includes a second time period, the first time period is earlier than the second time period, and a quantity of symbols included in the first time period and a quantity of symbols included in the second time period are the same or different.

Optionally, before the terminal device obtains the resource indication information, the network device needs to determine whether the uplink cascading channel and the downlink cascading channel between the network device and the terminal device have reciprocity. Then, the resource indication information is configured based on the reciprocity.

In some embodiments, the network device presets that the uplink cascading channel and the downlink cascading channel between the network device and the terminal device have no reciprocity. Alternatively, the network device determines, based on position information of the terminal device, whether the uplink cascading channel and the downlink cascading channel between the network device and the terminal device have reciprocity.

When the uplink cascading channel and the downlink cascading channel between the network device and the terminal device have reciprocity, the network device may obtain uplink channel information based on an uplink reference signal sent by the terminal device and with reference to a current IRS array control parameter. Then, the network device estimates downlink channel information based on the uplink channel information, and further determines an adjusted IRS array control parameter based on the downlink channel information, to complete channel design.

Optionally, the network device needs to estimate the downlink channel information based on the uplink reference signal. Therefore, in the flexible slot, the first UL transmission resource needs to be configured first, and then the first DL transmission resource is configured, that is, the first time period is earlier than the second time period.

For example, the network device may configure one or more consecutive earlier symbols in symbols other than a symbol used to transmit the resource indication information in the flexible slot as UL symbols, and configure a remaining symbol as a DL symbol. For example, the flexible slot includes 14 symbols in total with a symbol number 0 to a symbol number 13. Symbols with the symbol number 0 and the symbol number 1 are configured as DL symbols, to transmit the resource indication information. Symbols with the symbol number 3 to the symbol number 8 are configured as UL symbols, that is, the first time period includes six UL symbols. Symbols with the symbol number 9 to the symbol number 13 are configured as DL symbols, that is, the second time period includes five DL symbols. A symbol with the symbol number 2 is configured as a flexible symbol, to convert a downlink transmission mode to an uplink transmission mode.

In another implementation, one or more first UL transmission resources and one or more first DL transmission resources may be configured in the flexible slot. In this case, the first time period and the second time period may be implemented alternately. The earlier first time period and the later second time period may be considered as a group of time periods, and the flexible slot includes one or more groups of the time periods.

For example, the network device may alternately configure symbols in the flexible slot except symbols used to transmit the resource indication information as UL symbols and DL symbols, and ensure that the UL symbols are configured first. For example, symbols with the symbol number 0 and the symbol number 1 are configured as DL symbols, to transmit the resource indication information. Symbols with the symbol number 3 to the symbol number 5 are configured as UL symbols, that is, the first time period includes three UL symbols. Symbols with the symbol number 6 to the symbol number 8 are configured as DL symbols, that is, the second time period includes three DL symbols. Symbols with the symbol number 10 and the symbol number 11 are configured as UL symbols, that is, another first time period includes two UL symbols. A symbol with the symbol number 12 is configured as a DL symbol, that is, another second time period includes one DL symbol. Symbols with the symbol number 2 and the symbol number 9 are configured as flexible symbols, to convert a downlink transmission mode to an uplink transmission mode.

In this way, local reciprocity of the IRS array is used to quickly determine the IRS array control parameter.

In a possible implementation, the first indication information further includes a first IRS array control parameter, and the method further includes: the terminal device sends an uplink reference signal to the network device by using the first UL transmission resource, so that the network device obtains a second IRS array control parameter based on the first IRS array control parameter and the uplink reference signal. The terminal device receives, by using the first DL transmission resource, a first downlink signal and/or first downlink data that are/is reflected by the IRS array based on the second IRS array control parameter.

In other words, the terminal device needs to first send the uplink reference signal. After the network device determines the second IRS array control parameter, the terminal device can receive the first downlink signal and/or the first downlink data that are/is sent by the network device and reflected by the IRS array based on the second IRS array control parameter.

Subsequently, the IRS array reflects, based on the second IRS array control parameter, the uplink signal sent by the terminal device. When a sum rate of the uplink signal of the terminal device obtained by the network device is greater than the first IRS array control parameter, the sum rate of the uplink signal is obtained. In other words, an adjusted second IRS array control parameter can be used to increase the sum rate at which the terminal device sends the uplink signal. FIG. 3 shows a relationship between a signal-to-noise ratio at a transmitting end and a sum rate at a receiving end in a combination of different quantities of active antennas and different quantities of IRS passive antennas on a base station side. When signal-to-noise ratios at the transmitting end are the same, compared with a conventional MIMO system in which a large-scale active antenna array is configured, in an IRS-MIMO system, a small-scale active antenna array is configured and a medium-scale IRS array is configured on the base station side. Therefore, a large sum rate can be obtained, good communication performance can be achieved, and power consumption on the base station side can be effectively reduced.

In a possible implementation, an uplink cascading channel and a downlink cascading channel between the terminal device and the network device have no reciprocity, the resource indication information includes second indication information, the second indication information includes second resource configuration information, the second resource configuration information is used to configure a second DL transmission resource and a second UL transmission resource, the second DL transmission resource includes a third time period, the second UL transmission resource includes a fourth time period, the third time period is earlier than the fourth time period, and a quantity of symbols included in the third time period and a quantity of symbols included in the fourth time period are the same or different.

When the uplink cascading channel and the downlink cascading channel between the network device and the terminal device have no reciprocity, the network device needs to determine an adjusted IRS array control parameter based on the downlink channel information measured by the terminal device and with reference to the current IRS array control parameter, to complete the channel design. Therefore, the network device needs to first configure the second DL transmission resource used to send downlink data and/or a downlink signal, and then configure the second UL transmission resource used to transmit a downlink channel information measurement result. That is, the third time period is earlier than the fourth time period.

For example, the network device may configure one or more consecutive earlier symbols in symbols other than a symbol used to transmit the resource indication information in the flexible slot as DL symbols, and configure a remaining symbol as a UL symbol. For example, symbols with the symbol number 0 and the symbol number 1 are configured as DL symbols, to transmit the resource indication information. Symbols with the symbol number 2 to the symbol number 8 are configured as DL symbols, that is, the third time period includes seven DL symbols. Symbols with the symbol number 10 to the symbol number 12 are configured as UL symbols, that is, the fourth time period includes three UL symbols. A symbol with the symbol number 9 is configured as a flexible symbol, to convert a downlink transmission mode to an uplink transmission mode. A symbol with the symbol number 13 is configured as a DL symbol, to transmit, to the IRS array, the IRS array control parameter determined by the network device.

In another possible implementation, one or more second DL transmission resources and one or more second UL transmission resources may be configured in the flexible slot. In this case, the third time period and the fourth time period may be implemented alternately. The earlier third time period and the later fourth time period may be considered as a group of time periods, and the flexible slot includes one or more groups of the time periods.

For example, the network device may alternately configure symbols in the flexible slot except symbols used to transmit the resource indication information as DL symbols and UL symbols, and ensure that the DL symbols are configured first. For example, symbols with the symbol number 0 and the symbol number 1 are configured as DL symbols, to transmit the resource indication information. Symbols with the symbol number 2 and the symbol number 3 are configured as DL symbols, that is, the third time period includes two UL symbols. Symbols with the symbol number 5 and the symbol number 6 are configured as UL symbols, that is, the fourth time period includes two UL symbols. Symbols with the symbol number 7 and the symbol number 8 are configured as DL symbols, that is, another third time period includes two DL symbols. Symbols with the symbol number 10 and the symbol number 11 are configured as UL symbols, that is, another fourth time period includes two UL symbols. Symbols with the symbol number 4 and the symbol number 9 are configured as flexible symbols, to convert a downlink transmission mode to an uplink transmission mode. A symbol with the symbol number 12 is configured as a DL symbol, to transmit, to the IRS array, the IRS array control parameter determined by the network device.

In a possible implementation, the method further includes: a target terminal device sends request information to the network device, where the request information is used to request to participate in a process of determining the IRS array control parameter, and the target terminal device is at least one device in the terminal device.

The downlink channel information includes downlink direct channel information and downlink cascading channel information. The downlink cascading channel information has a large data amount, and a measurement and feedback periodicity is long. Therefore, some of the terminal devices may be selected to participate in the channel design to reduce an amount of measure data.

Optionally, the target terminal device is a device participating in determining the IRS array control parameter. For example, when the terminal device moves to a cell edge, a channel design needs to be performed to improve a communication rate. Therefore, request information is sent to the network device, so that the network device may determine, based on the request information, a device participating in determining the IRS array control parameter.

In a possible implementation, the method further includes: the target terminal device receives, by using the second DL transmission resource, a second downlink signal and second downlink data that are sent by the network device. The target terminal device obtains first channel information based on the second downlink signal and the second downlink data, where the first channel information includes downlink direct channel information and downlink cascading channel information. The target terminal device sends the first channel information to the network device by using the second UL transmission resource.

Optionally, there are a plurality of target terminal devices, and a transmission mode of the first channel information is a multiplexing transmission mode.

In this way, the network device may determine the IRS array control parameter based on a downlink channel measurement result of the target terminal device, thereby improving channel optimization efficiency.

In a possible implementation, the second UL transmission resource further includes physical uplink shared channel (PUSCH) resource information configured by the network device for the target terminal device, and a PUSCH resource is used to transmit the first channel information.

In some embodiments, if the terminal device does not have a requirement of sending uplink data, the network device configures only a physical uplink control channel (PUCCH) resource for the terminal device, to transmit control information. A PUCCH has a small capacity, and cannot complete independently transmission of the first channel information. Therefore, the network device further needs to configure the PUSCH resource for the target terminal device. If there are a plurality of target terminal devices, the plurality of target terminal devices may perform transmission in a multiplexing mode on allocated UL symbols by using a PUSCH and a PUCCH.

In a possible implementation, the first flexible symbol to the $(1+i)^{th}$ flexible symbol in the flexible slot are used to transmit the resource indication information, where i is a natural number, and a value of i is determined by the network device based on one or more of the following items: a quantity of antennas of the network device, a quantity of antennas of the terminal device or the target terminal device, a quantity of terminal devices or target terminal devices, a quantity of IRS arrays, and a quantity of reflection units in the IRS array.

Optionally, the resource indication information includes a resource configuration manner. Therefore, the terminal device can configure resources in the flexible slot only after receiving the resource indication information. Therefore, the first i symbols in time domain in the flexible slot are configured as a downlink resource used to transmit the resource indication information.

Further, if a large quantity of resources need to be configured, more flexible symbols need to be configured to transmit the resource indication information.

In a possible implementation, there are a plurality of flexible slots used to determine the IRS array control parameter, and the first flexible slot in the plurality of flexible slots is used to transmit the resource indication information.

Optionally, there are a plurality of flexible slots, first time periods of the plurality of flexible slots are the same or different, and second time periods of the plurality of flexible slots are the same or different.

Optionally, there are a plurality of flexible slots, third time periods of the plurality of flexible slots are the same or different, and fourth time periods of the plurality of flexible slots are the same or different.

For example, the network device needs to determine the IRS array control parameter by using three flexible slots, configures DL resources in the first flexible slot and the second flexible slot in time domain, and does not need to feed back a downlink channel measurement result, that is, does not need to configure a resource used to transmit the first channel information. A partial DL resource and a partial UL resource are configured in the third flexible slot, that is, both downlink channel measurement and a feedback of a downlink channel measurement result are taken into consideration.

In this way, the process of determining the IRS array control parameter is completed in the third flexible slot, thereby avoiding reducing resource utilization caused by repeated adjustment of the uplink and downlink transmission modes in the process of determining the IRS array control parameter.

For another example, the network device configures a DL resource in the first flexible slot in time domain, and does not need to feed back a downlink channel measurement result, and the DL resource is mainly used to measure a downlink channel of an IRS array 1. Symbols with a symbol number 6 to a symbol number 10 in the second flexible slot are configured as UL symbols, to feed back a downlink channel measurement result of the IRS array 1, and then a process of determining a control parameter of the IRS array 1 is first completed. A DL resource and a UL resource are configured in the third flexible slot, and are used to complete a process of determining a control parameter of an IRS array 2.

In this way, if a quantity of IRS arrays in a cell and/or a quantity of reflection units in the IRS array are/is large, the process of determining the IRS array control parameter may be gradually completed. An IRS array whose control parameter has been updated or a control unit whose control parameter has been updated in the IRS array may gradually participate in an uplink and downlink signal transmission process, thereby gradually improving channel performance and shortening a channel design periodicity of an IRS-multiple-input multiple-output (MIMO) system.

According to a second aspect, this disclosure provides a resource allocation method. The method may be performed by a network device (such as a base station), or may be performed by a component (such as a chip system) in the network device. The method may include: the network device determines resource indication information, where the resource indication information indicates an UL transmission resource and a DL transmission resource in a flexible slot, and the flexible slot is used to determine an intelligent reflecting surface IRS array control parameter. The network device sends the resource indication information to a terminal device.

In a possible implementation, an uplink cascaded channel and a downlink cascaded channel between the network device and the terminal device have reciprocity, the resource indication information includes first indication information, the first indication information includes first resource configuration information, the first resource configuration information is used to configure a first UL transmission resource and a first DL transmission resource, the first UL transmission resource includes a first time period, the first DL transmission resource includes a second time period, the first time period is earlier than the second time period, and a quantity of symbols included in the first time period and a quantity of symbols included in the second time period are the same or different.

In a possible implementation, the first indication information further includes a first IRS array control parameter, and the method further includes: the network device receives, by using the first UL transmission resource, an uplink reference signal reflected by an IRS array based on the first IRS array control parameter, and obtains a second IRS array control parameter based on the uplink reference signal. The network device sends the second IRS array control parameter to the IRS array by using the first DL transmission resource, so that the IRS array performs UL transmission and DL transmission based on the second IRS array control parameter.

In a possible implementation, an uplink cascading channel and a downlink cascading channel between the network device and the terminal device have no reciprocity, the resource indication information includes second indication information, the second indication information includes second resource configuration information, the second resource configuration information is used to configure a second DL transmission resource and a second UL transmission resource, the second DL transmission resource includes a third time period, the second UL transmission resource includes a fourth time period, the third time period is earlier than the fourth time period, and a quantity of symbols included in the third time period and a quantity of symbols included in the fourth time period are the same or different.

In a possible implementation, the method further includes: the network device receives request information sent by a target terminal device, where the request information is used to request to participate in a process of determining the IRS array control parameter, and the target terminal device is at least one device in the terminal device.

In a possible implementation, the method further includes: the network device sends a downlink signal and downlink data to the target terminal device by using the second DL transmission resource. The network device receives, by using the second UL transmission resource, first channel information sent by the target terminal device, where the first channel information is channel information that is obtained by the target terminal device based on the downlink signal and the downlink data, and the first channel information includes downlink direct channel information and downlink cascading channel information.

In a possible implementation, the method further includes: the network device obtains a third IRS array control parameter by using the first channel information.

In some embodiments, the network device may determine an adjusted third IRS array control parameter based on a result of measuring downlink channel information by the terminal device. The third IRS array control parameter is sent to the IRS array, so that the IRS array reflects an incident signal based on the third IRS array control parameter, to implement channel optimization.

In a possible implementation, the second UL transmission resource further includes PUSCH resource information configured by the network device for the target terminal device, and a PUSCH resource is used to transmit the first channel information.

In a possible implementation, the first flexible symbol to the $(1+i)^{th}$ flexible symbol in the flexible slot are used to transmit the resource indication information, where i is a natural number, and a value of i is determined by the network device based on one or more of the following items: a quantity of antennas of the network device, a quantity of antennas of the terminal device or the target terminal device, a quantity of terminal devices or target terminal devices, a quantity of IRS arrays, and a quantity of reflection units in the IRS array.

In a possible implementation, before that the network device determines resource indication information, the method further includes: the network device determines whether the uplink cascading channel and the downlink cascading channel between the network device and the terminal device have reciprocity.

In a possible implementation, that the network device determines whether the uplink cascading channel and the downlink cascading channel between the network device and the terminal device have reciprocity includes: the network device presets that the uplink cascading channel and the downlink cascading channel between the network device and the terminal device have no reciprocity. Alternatively, the network device determines, based on position information of the terminal device, whether the uplink cascading channel and the downlink cascading channel between the network device and the terminal device have reciprocity.

In addition, for technical effects of the resource allocation method according to the second aspect, refer to the technical effects of the resource allocation method according to the first aspect. Details are not described herein again.

According to a third aspect, this disclosure provides a resource allocation apparatus. The apparatus is used for a terminal device, and the apparatus may include a receiving module and a processing module. The receiving module is configured to obtain resource indication information, where the resource indication information indicates an UL transmission resource and a DL transmission resource in a flexible slot, and the flexible slot is used to determine an intelligent reflecting surface IRS array control parameter. The processing module is configured to perform UL transmission and DL transmission based on the resource indication information.

In a possible implementation, an uplink cascaded channel and a downlink cascaded channel between the apparatus and a network device have reciprocity, the resource indication information includes first indication information, the first indication information includes first resource configuration information, the first resource configuration information is used to configure a first UL transmission resource and a first DL transmission resource, the first UL transmission resource includes a first time period, the first DL transmission resource includes a second time period, the first time period is earlier than the second time period, and a quantity of symbols included in the first time period and a quantity of symbols included in the second time period are the same or different.

In a possible implementation, the first indication information further includes a first IRS array control parameter. The apparatus further includes a sending module. The sending module is configured to send an uplink reference signal to the network device by using the first UL transmission resource, so that the network device obtains a second IRS array control parameter based on the first IRS array control parameter and the uplink reference signal. The receiving module is further configured to receive, by using the first DL transmission resource, a first downlink signal and/or first downlink data that are/is reflected by an IRS array based on the second IRS array control parameter.

In a possible implementation, an uplink cascading channel and a downlink cascading channel between the apparatus and a network device have no reciprocity, the resource indication information includes second indication information, the second indication information includes second resource configuration information, the second resource configuration information is used to configure a second DL transmission resource and a second UL transmission resource, the second DL transmission resource includes a third time period, the second UL transmission resource includes a fourth time period, the third time period is earlier than the fourth time period, and a quantity of symbols included in the third time period and a quantity of symbols included in the fourth time period are the same or different.

In a possible implementation, the apparatus is used for a target terminal device, and the target terminal device is at least one device in the terminal device. The apparatus further includes a sending module. The sending module is configured to send request information to the network device, where the request information is used to request to participate in a process of determining the IRS array control parameter.

In a possible implementation, the receiving module is further configured to receive, by using the second DL transmission resource, a second downlink signal and second downlink data that are sent by the network device. The processing module is further configured to obtain first channel information based on the second downlink signal and the second downlink data, where the first channel information includes downlink direct channel information and downlink cascading channel information. The sending module is further configured to send the first channel information to the network device by using the second UL transmission resource.

In a possible implementation, the second UL transmission resource further includes PUSCH resource information configured by the network device for the apparatus, and a PUSCH resource is used to transmit the first channel information.

In a possible implementation, the first flexible symbol to the $(1+i)^{th}$ flexible symbol in the flexible slot are used to transmit the resource indication information, where i is a natural number, and a value of i is determined by the network device based on one or more of the following items: a quantity of antennas of the network device, a quantity of antennas of the apparatus or the target terminal device, a quantity of apparatus or target terminal devices, a quantity of IRS arrays, and a quantity of reflection units in the IRS array.

It should be noted that the sending module and the receiving module may alternatively be integrated together, for example, a transceiver module. This is not limited in embodiments of this disclosure.

Optionally, the resource allocation apparatus according to the third aspect may further include a storage module, and the storage module stores a program or instructions. When the processing module executes the program or the instructions, the resource allocation apparatus according to the third aspect may perform the resource allocation method according to the first aspect.

It should be noted that the resource allocation apparatus according to the third aspect may be the terminal device, a chip (system) or another part or component that may be disposed in the terminal device. This is not limited in this disclosure.

In addition, for technical effects of the resource allocation apparatus according to the third aspect, refer to the technical effects of the resource allocation method according to the first aspect. Details are not described herein again.

According to a fourth aspect, this disclosure provides a resource allocation apparatus. The apparatus is used for a network device, and the apparatus may include a processing module and a sending module. The processing module is configured to determine resource indication information, where the resource indication information indicates an UL transmission resource and a DL transmission resource in a flexible slot, and the flexible slot is used to determine an intelligent reflecting surface IRS array control parameter. The sending module is configured to send the resource indication information to a terminal device.

In a possible implementation, an uplink cascaded channel and a downlink cascaded channel between the apparatus and the terminal device have reciprocity, the resource indication information includes first indication information, the first indication information includes first resource configuration information, the first resource configuration information is used to configure a first UL transmission resource and a first DL transmission resource, the first UL transmission resource includes a first time period, the first DL transmission resource includes a second time period, the first time period is earlier than the second time period, and a quantity of symbols included in the first time period and a quantity of symbols included in the second time period are the same or different.

In a possible implementation, the first indication information further includes a first IRS array control parameter. The apparatus further includes a receiving module. The receiving module is configured to receive, by using the first UL transmission resource, an uplink reference signal reflected by an IRS array based on the first IRS array control parameter. The processing module is further configured to obtain a second IRS array control parameter based on the uplink reference signal. The sending module is further configured to send the second IRS array control parameter to the IRS array by using the first DL transmission resource, so that the IRS array performs UL transmission and DL transmission based on the second IRS array control parameter.

In a possible implementation, an uplink cascading channel and a downlink cascading channel between the apparatus and the terminal device have no reciprocity, the resource indication information includes second indication information, the second indication information includes second resource configuration information, the second resource configuration information is used to configure a second DL transmission resource and a second UL transmission resource, the second DL transmission resource includes a third time period, the second UL transmission resource includes a fourth time period, the third time period is earlier than the fourth time period, and a quantity of symbols included in the third time period and a quantity of symbols included in the fourth time period are the same or different.

In a possible implementation, the apparatus further includes a receiving module. The receiving module is configured to receive request information sent by a target terminal device, where the request information is used to request to participate in a process of determining the IRS array control parameter, and the target terminal device is at least one device in the terminal device.

In a possible implementation, the sending module is further configured to send a downlink signal and downlink data to the target terminal device by using the second DL transmission resource. The receiving module is further configured to receive, by using the second UL transmission resource, first channel information sent by the target terminal device, where the first channel information is channel information that is obtained by the target terminal device based on the downlink signal and the downlink data, and the first channel information includes downlink direct channel information and downlink cascading channel information.

In a possible implementation, the second UL transmission resource further includes PUSCH resource information configured by the apparatus for the target terminal device, and a PUSCH resource is used to transmit the first channel information.

In a possible implementation, the first flexible symbol to the $(1+i)^{th}$ flexible symbol in the flexible slot are used to transmit the resource indication information, where i is a natural number, and a value of i is determined by the apparatus based on one or more of the following items: a quantity of antennas of the apparatus, a quantity of antennas of the terminal device or the target terminal device, a quantity of terminal devices or target terminal devices, a quantity of IRS arrays, and a quantity of reflection units in the IRS array.

In a possible implementation, the processing module is further configured to determine whether an uplink cascading channel and a downlink cascading channel between the apparatus and the terminal device have reciprocity.

In a possible implementation, the processing module is configured to preset that the uplink cascading channel and the downlink cascading channel between the apparatus and the terminal device have no reciprocity. Alternatively, the apparatus determines, based on position information of the terminal device, whether the uplink cascading channel and the downlink cascading channel between the apparatus and the terminal device have reciprocity.

It should be noted that the sending module and the receiving module may alternatively be integrated together, for example, a transceiver module. This is not limited in embodiments of this disclosure.

Optionally, the resource allocation apparatus according to the fourth aspect may further include a storage module, and the storage module stores a program or instructions. When the processing module executes the program or the instructions, the resource allocation apparatus according to the fourth aspect may perform the resource allocation method according to the second aspect.

It should be noted that the resource allocation apparatus according to the fourth aspect may be the network device, a chip (system) or another part or component that may be disposed in the network device. This is not limited in this disclosure.

In addition, for technical effects of the resource allocation apparatus according to the fourth aspect, refer to the technical effects of the resource allocation method according to the second aspect. Details are not described herein again.

According to a fifth aspect, this disclosure provides a communication apparatus. The apparatus has a function of implementing the resource allocation method in any one of the first aspect and the possible implementations of the first aspect. The function may be implemented by hardware, or may be implemented by hardware executing corresponding software. The hardware or the software includes one or more modules corresponding to the function.

According to a sixth aspect, this disclosure provides a communication apparatus. The apparatus has a function of implementing the resource allocation method in any one of the second aspect and the possible implementations of the second aspect. The function may be implemented by hardware, or may be implemented by hardware executing corresponding software. The hardware or the software includes one or more modules corresponding to the function.

According to a seventh aspect, a communication apparatus is provided, including a processor and a memory. The memory is configured to store computer-executable instructions. When the communication apparatus runs, the processor executes the computer-executable instructions stored in the memory, so that the communication apparatus performs the resource allocation method in any one of the first aspect or the possible implementations of the first aspect, or the second aspect or the possible implementations of the second aspect.

According to an eighth aspect, an embodiment of this disclosure provides a communication apparatus. The apparatus may be a chip system. The chip system includes a processor, and may further include a memory, configured to implement functions of the resource allocation method in any one of the first aspect or the possible implementations of the first aspect, or the second aspect or the possible implementations of the second aspect. The chip system may include a chip, or include a chip and another discrete device.

According to a ninth aspect, a communication apparatus is provided. The apparatus may be a circuit system, the circuit system includes a processing circuit, and the processing circuit is configured to perform the resource allocation method in any one of the first aspect or the possible implementations of the first aspect, or the second aspect or the possible implementations of the second aspect.

According to a tenth aspect, this disclosure provides a computer-readable storage medium. The computer-readable storage medium stores instructions. When a computer executes the instructions, the computer performs the resource allocation method in any one of the first aspect or the possible implementations of the first aspect, or the second aspect or the possible implementations of the second aspect.

According to an eleventh aspect, this disclosure provides a computer program product including instructions. When the computer program product runs on a computer, the computer is enabled to perform the resource allocation method in any one of the first aspect or the possible implementations of the first aspect, or the second aspect or the possible implementations of the second aspect.

DESCRIPTION OF EMBODIMENTS

The following describes in detail a resource allocation method and apparatus provided in embodiments of this disclosure with reference to the accompanying drawings.

It should be understood that the technical solutions of embodiments of this disclosure may be applied to various communication systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a public land mobile network (PLMN) system, a 5th generation (5G) system, a new radio (NR) system, a future communication system, or another similar communication system.

Figure 1:
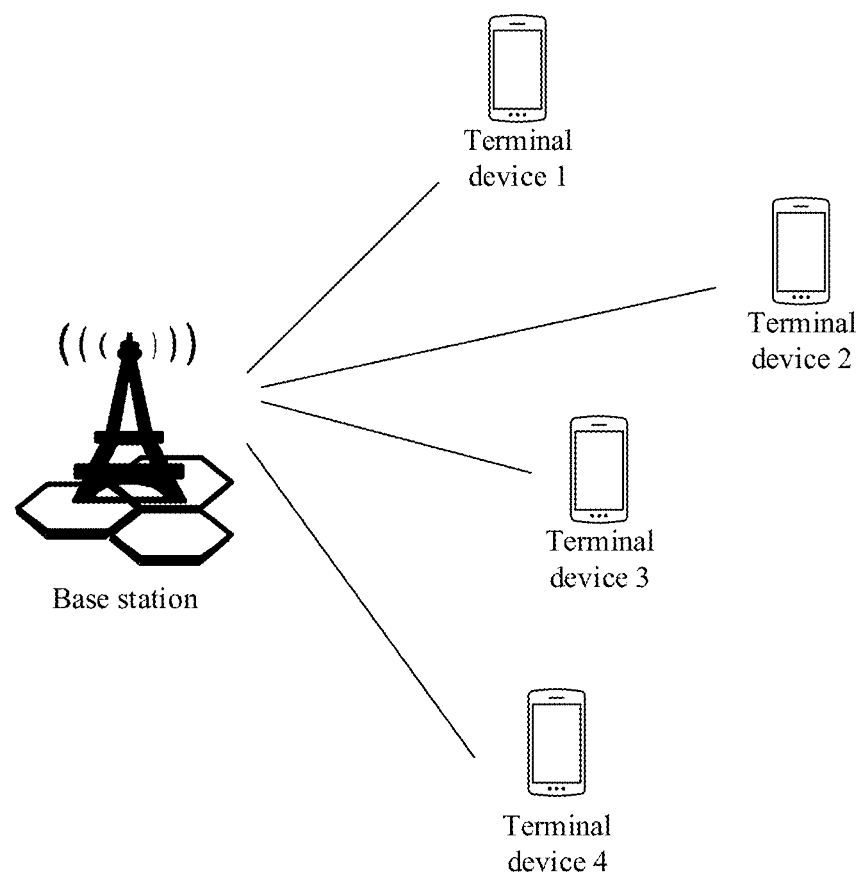
FIG. 1 is a schematic structural diagram 1 of a communication network in a conventional technology according to an embodiment of this disclosure.
Figure 2:
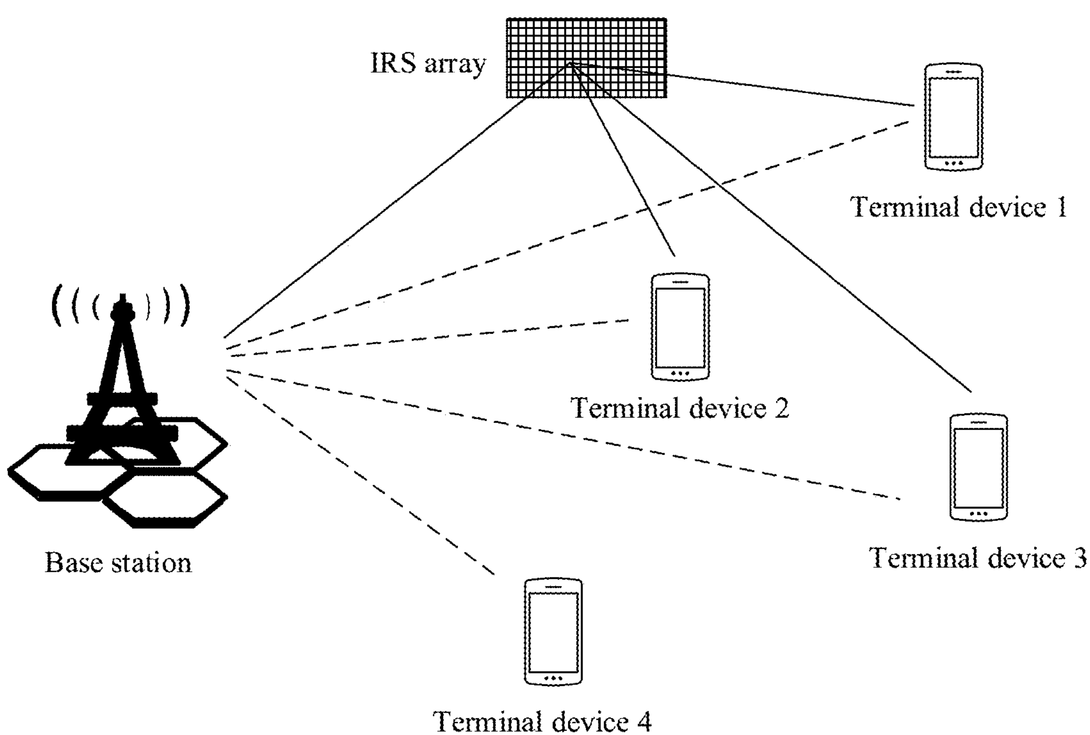
FIG. 2 is a schematic structural diagram 2 of a communication network in a conventional technology according to an embodiment of this disclosure.
Figure 3:
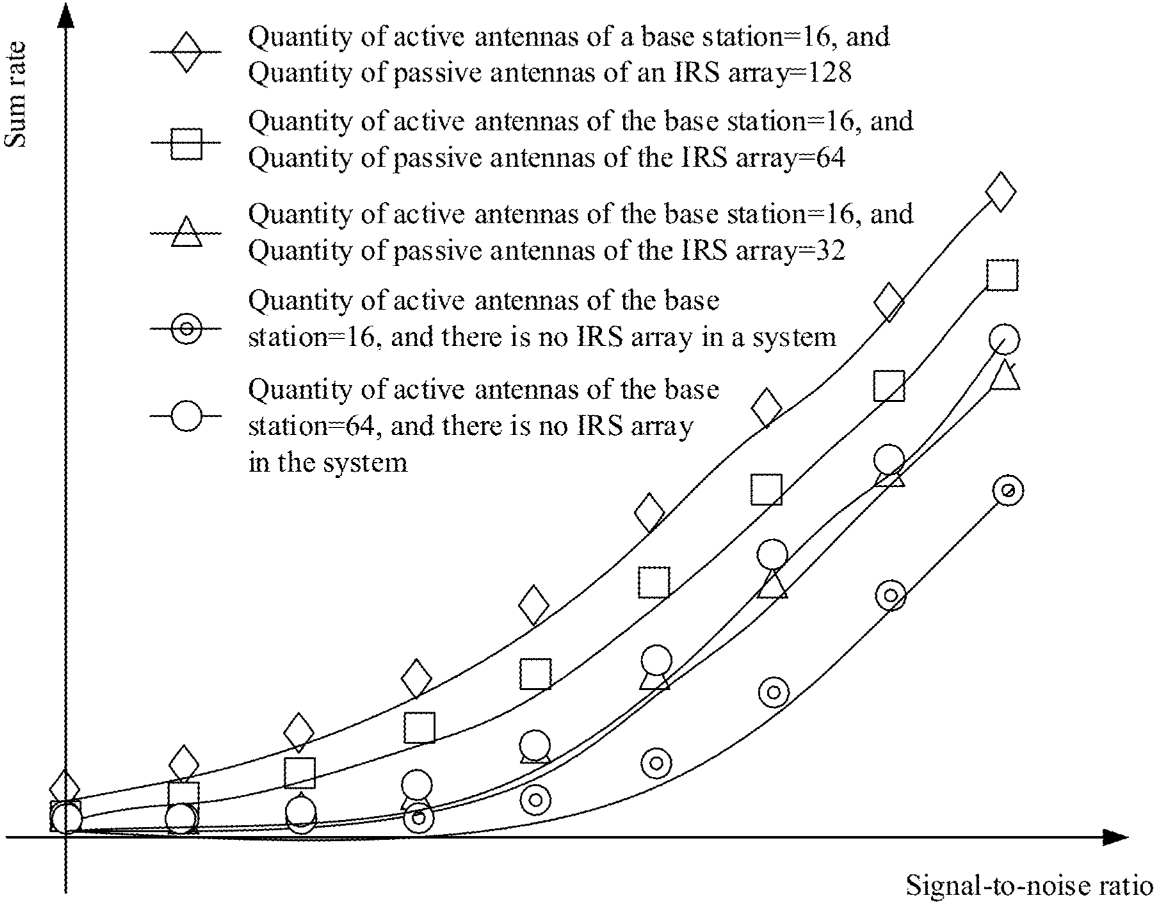
FIG. 3 is a schematic diagram of a relationship between a signal-to-noise ratio of a transmitting end and a sum rate of a receiving end according to an embodiment of this disclosure.
Figures 4, 5:
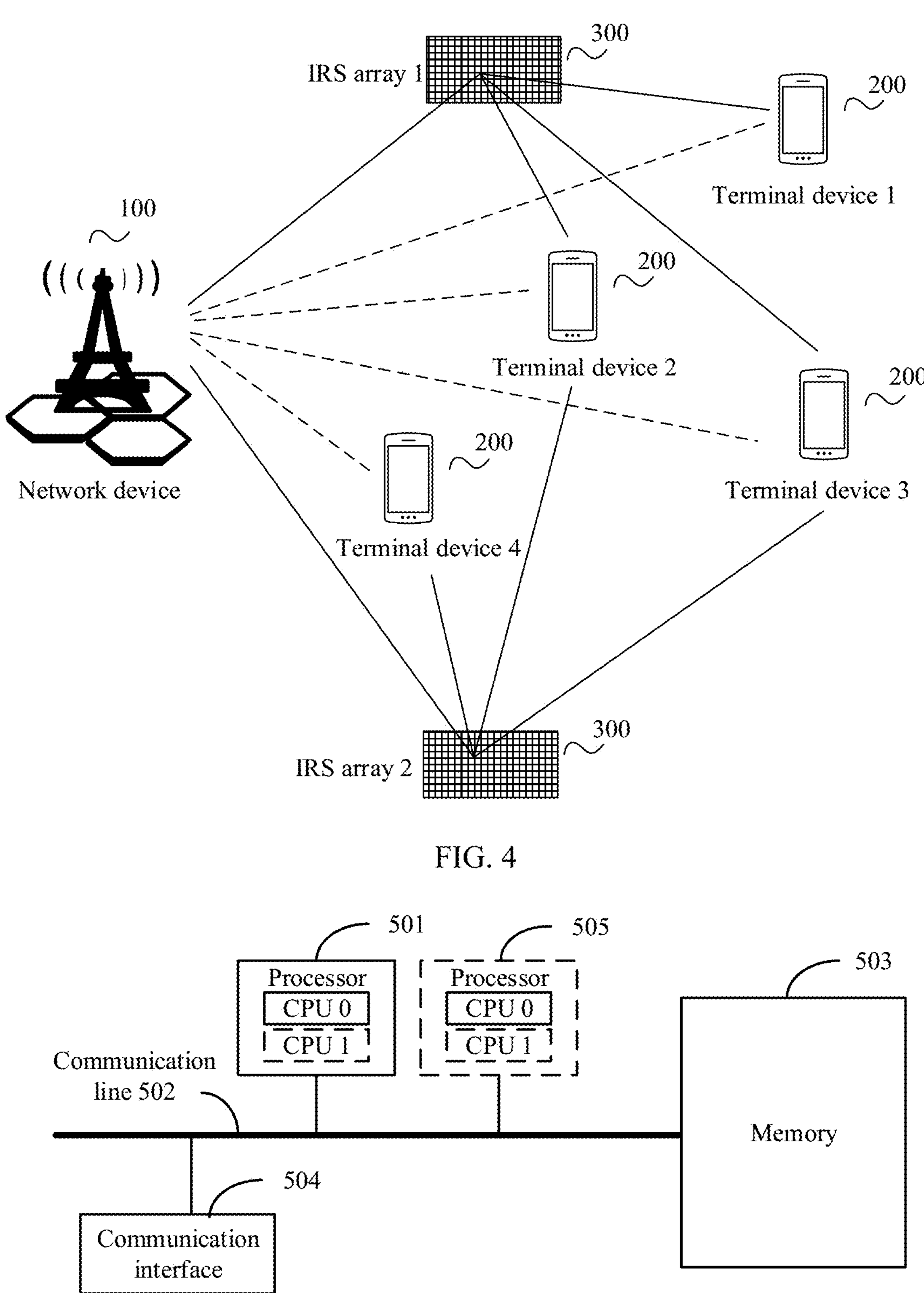
FIG. 4 is a schematic structural diagram of a communication network according to an embodiment of this disclosure.
FIG. 5 is a schematic structural diagram of a communication device according to an embodiment of this disclosure.

The following provides a network architecture in embodiments of this disclosure. FIG. 4 shows an architecture of a communication system applicable to embodiments of this disclosure. The communication system includes a network device 100, one or more terminal devices 200 communicating with the network device 100 (for example, a terminal device 1 to a terminal device 4 in FIG. 4), and one or more intelligent reflecting surface (IRS) arrays (for example, an IRS array 1 and an IRS array 2 in FIG. 4).

A channel used for direct communication between the network device 100 and the terminal device 200 is referred to as a direct channel (a dashed line shown in FIG. 4), and includes an uplink direct channel and a downlink direct channel. The uplink direct channel is used by the terminal device 200 to send an uplink signal to the network device 100, and the downlink direct channel is used by the network device 100 to send a downlink signal to the terminal device 200. A channel through which the network device 100 communicates with the terminal device 200 by using an IRS array 300 is referred to as a cascading channel (a solid line shown in FIG. 4), and includes an uplink cascading channel and a downlink cascading channel. The uplink cascading channel is used by the terminal device 200 to send an uplink signal to the network device 100, and the downlink cascading channel is used by the network device 100 to send a downlink signal to the terminal device 200.

In a scenario, the terminal devices 1 to 4 are terminal devices within a coverage area of a cell signal of the network device. It is assumed that the terminal device 2 and the terminal device 4 are located at a center of a cell, and the terminal device 1 and the terminal device 3 are located at an edge of the cell. The network device invokes a same IRS array or different IRS arrays, configures an IRS array control parameter, and performs a channel design, to improve performance of a channel between the network device and the terminal device.

For example, the network device invokes the IRS array 1 and the IRS array 2 to serve the terminal device 3 located at the edge of the cell, so that the terminal device 3 obtains a diversity gain and a multiplexing gain, to improve channel quality of the terminal device 3 and improve transmission performance.

For another example, the network device invokes the IRS array 1 to serve the terminal device 1 located at the edge of the cell, so that the terminal device 1 obtains a higher diversity gain, to reduce power consumption.

It should be noted that the terminal device may receive a downlink signal reflected by an IRS array, to obtain a diversity gain. The terminal device receives downlink signals transmitted by a plurality of IRS arrays, to obtain a multiplexing gain. For a channel design of IRS-multiple-input multiple-output (MIMO), refer to a conventional technology. Details are not described for some embodiments.

Optionally, the IRS array 300 is a plane array including a large quantity of reconfigurable passive elements (for example, low-cost printed dipoles). Each passive element may be referred to as a reflection unit. Each reflection unit reflects an incident signal with a specific phase offset, and cooperates to implement beamforming or suppress interference at a specified receiving end.

A plurality of IRS arrays 300 may constitute one IRS network. When the IRS array includes a large quantity of reflection units, one or more reflection units in the IRS array may be grouped into one IRS subarray, and one IRS array includes one or more IRS subarrays.

Optionally, the network device 100 may be a device that communicates with a wireless terminal by using one or more cells on an air interface of an access network. For example, the network device may be a base transceiver station (BTS) in a GSM system or CDMA, may be a NodeB (NB) in a WCDMA system, or may be an evolved NodeB (eNB or eNodeB) in an LTE system, or may be a network device in a satellite system, device-to-device (D2D), the internet of vehicles, or a machine-to-machine (M2M) system. Alternatively, the network device may be a relay station, an access point, a vehicle-mounted device, a wearable device, a network side device in a future 5G network or a network after 5G, or a network device in a future evolved PLMN network. An apparatus for implementing a function of the network device 100 may be a network device, or may be an apparatus (for example, a chip system in the network device) that supports the network device in implementing the function. Optionally, the network device 100 may perform attribute management on the air interface, and coordinate an attribute of the air interface. The network device 100 includes various forms of macro base stations and micro base stations (also referred to as small cells), for example, a relay device of a relay station or a chip of the relay device, a transmission reception point (TRP), an eNB, a next-generation network node (g NodeB, gNB), and an evolved NodeB (ng-eNB) connected to a next-generation core network. Alternatively, in a distributed base station scenario, the network device may be a base band unit (BBU) and a remote radio unit (RRU), or in a cloud radio access network (CRAN) scenario, the network device may be a baseband pool (BBU pool) and an RRU.

Optionally, the terminal device 200 in some embodiments includes but is not limited to a vehicle-mounted device, a wearable device, a computing device, a chip built in the computing device, or another processing device connected to a wireless modem; and may further include a cellular phone, a personal communication service (PCS) phone, a cordless phone, a session initiation protocol (SIP) phone, a smartphone, a personal digital assistant (PDA) computer, a tablet computer, a laptop computer, a wireless modem, a handheld device, or a wireless local loop (WLL) station. The wireless terminal may alternatively be a subscriber unit (SU), a subscriber station (SS), a mobile station (MB), a remote station (RS), a remote terminal (RT), a user terminal (UT), a terminal device (user device, UD), user equipment (UE), a wireless data card, a machine type communication (MTC) terminal, a terminal device, a customer premises equipment (CPE), an access terminal (AT), an access point (AP), a user agent (UA), an artificial intelligence (AI) terminal, or the like. In some embodiments, an apparatus for implementing a function of the terminal device 200 may be the terminal device, or may be an apparatus (for example, a chip system in the terminal device) that supports the terminal device in implementing the function.

It should be noted that the term "communication" in some embodiments may alternatively be described as "data transmission", "information transmission", "signal transmission", "transmission", or the like.

Optionally, the network device and the terminal device in some embodiments may be implemented by using different devices. For example, the network device and the terminal device in some embodiments may be implemented by using the communication devices in FIG. 5. FIG. 5 is a schematic structural diagram of hardware of a communication device according to an embodiment of this disclosure. The communication device includes at least one processor 501, a communication line 502, a memory 503, and at least one communication interface 504. The memory 503 may be further included in the processor 501.

The processor 501 may be a general-purpose central processing unit (CPU), a microprocessor, an application-specific integrated circuit (ASIC), or one or more integrated circuits configured to control execution of programs in the solutions in this disclosure.

The communication line 502 may include a path for communicating information between the components.

The communication interface 504 is configured to communicate with another device. In some embodiments, the communication interface may be a module, a circuit, a bus, an interface, a transceiver, or another apparatus that can implement a communication function, and is configured to communicate with another device. Optionally, when the communication interface is a transceiver, the transceiver may be an independently disposed transmitter, and the transmitter may be configured to send information to another device; or the transceiver may be an independently disposed receiver, configured to receive information from the another device. Alternatively, the transceiver may be a component that integrates information sending and information receiving functions. An implementation of the transceiver is not limited in some embodiments.

The memory 503 may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example but not limitation, many forms of RAMs may be used, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM) or another magnetic storage device, or any other medium capable of carrying or storing expected program code in a form of instructions or a data structure and capable of being accessed by a computer, but not limited thereto. The memory may exist independently, and is connected to the processor 501 through the communication line 502. Alternatively, the memory 503 may be integrated with the processor 501.

The memory 503 is configured to store computer-executable instructions for performing the solutions in this disclosure, and the processor 501 controls execution. The processor 501 is configured to execute the computer-executable instructions stored in the memory 503, to implement the resource allocation method provided in the following embodiments of this disclosure.

Optionally, the computer-executable instructions in some embodiments may also be referred to as application program code, instructions, a computer program, or another name. This is not limited to some embodiments.

During some implementations, in embodiments, the processor 501 may include one or more CPUs such as a CPU 0 and a CPU 1 in FIG. 5.

In some implementations, in embodiments, the communication device may include a plurality of processors, for example, the processor 501 and a processor 505 in FIG. 5. Each of the processors may be a single-core (single-CPU) processor or a multi-core (multi-CPU) processor. The processor herein may be one or more devices, circuits, and/or processing cores configured to process data (for example, computer program instructions).

It should be noted that when the processor is a general-purpose processor, a DSP, an ASIC, a field programmable gate array (FPGA), or another programmable logic device, discrete gate or transistor logic device, or discrete hardware component, the memory (a storage module) is integrated into the processor.

It should be noted that the memory described in this specification is intended to include but not limited to these memories and any memory of another appropriate type.

It should be noted that the communication apparatus may be a general-purpose device or a dedicated device. A type of the communication apparatus is not limited to some embodiments. The structure shown in some embodiments does not constitute a limitation on the communication apparatus. In some other embodiments of this disclosure, the communication apparatus may include more or fewer components than those shown in the figure, or combine some components, or split some components, or have different component arrangements. The components shown in the figure may be implemented by using hardware, software, or a combination of software and hardware.

The following describes some terms in embodiments of this disclosure, to facilitate understanding of a person skilled in the art.

(1) IRS Array Control Parameter

In some embodiments, a quantity of antennas configured with a network device is N, a quantity of antennas configured with a terminal device is M, and a quantity of reflection units in an IRS array is K. M, N, and K are positive integers. As shown in FIG. 4, a direct channel matrix between the network device and the terminal device is $G_{M\times N}$. A cascading channel between the network device and the terminal device includes a channel between the network device and the IRS array and a channel between the IRS array and the terminal device. A channel matrix between the network device and the IRS array is $(H_0)_{K\times N}$, and a channel matrix between the IRS array and the terminal device is $R_{M\times K}$.

In an IRS-MIMO system, a control parameter of a reflection unit in the IRS array may be adjusted by designing a phased matrix $\Phi_{K\times K}$ of the IRS array, to dynamically adjust performance of the IRS-MIMO system. A control parameter of each reflection unit in the IRS array constitutes an IRS array control parameter.

For example, performance of the IRS-MIMO system is optimized, so that the IRS-MIMO system can obtain a maximum downlink transmission rate, that is, the control parameter of the reflection unit needs to be adjusted to maximize a system capacity, and obtain a maximum sum rate. The system capacity C may be determined according to the following formula.

$$C = \max_{\substack{\theta, w_i, p_i \\ S.t.\ |\theta_i|=1; \\ \|w_i\|=1; \\ \sum_{i=1}^{u} p_i \le P_0}} \left( \sum_{i=1}^{u} \log \left( 1 + p_i \times \frac{[\theta^H, 1] \begin{bmatrix} \mathrm{diag}(r_i) H_0 w_i w_i^H H_0^H \mathrm{diag}(r_i^H),\ \mathrm{diag}(r_i) H_0 w_i w_i^H g_i^H \\ g_i w_i w_i^H H_0^H \mathrm{diag}(r_i^H),\ g_i w_i w_i^H g_i^H \end{bmatrix} [\theta^H, 1]^H}{\sigma_i^2 + [\theta^H, 1] \left( \sum_{j=1, j\ne i}^{u} p_j \times \begin{bmatrix} \mathrm{diag}(r_i) H_0 w_j w_j^H H_0^H \mathrm{diag}(r_i^H),\ \mathrm{diag}(r_i) H_0 w_j w_j^H g_j^H \\ g_i w_j w_j^H H_0^H \mathrm{diag}(r_i^H),\ g_i w_j w_j^H g_i^H \end{bmatrix} \right) [\theta^H, 1]^H} \right) \right)$$

In the foregoing formula for solving the system capacity C, θ=diag(Φ) indicates a control parameter of each reflection unit in the IRS array, that is, a phase parameter. The network device may generate, by designing adjustment of θ, a cascading channel required by the terminal device. $w_i$ indicates a transmitting precoding vector of an $i^{th}$ user in u users, and is used to enhance a link gain and eliminate interference between a plurality of user data streams. $p_i$ indicates a transmit power allocated by the network device to an $i^{th}$ terminal device in u terminal devices. By optimizing and designing a parameter set $\{\theta, w_i, p_i\}$, a maximum system sum rate is obtained. A diag function is used to convert a matrix into a vector, or convert a vector into a matrix. For example, diag($\Phi$) indicates that an element on a diagonal line in a matrix $\Phi$ is taken to form a new column vector. A corner mark "H" on the vector or the matrix indicates an operation of performing conjugate transposition on the current vector or matrix. For example, $w_i^H$ indicates an operation of performing conjugate transposition on a vector $w_i$, and $w_i^H$ is a conjugate transposition vector of the vector $w_i$.

Downlink channel information of the terminal device needs to be input to obtain the parameter set, and includes downlink direct channel information $\{g_i\}$ between the network device and the terminal device and downlink cascading channel information $\{diag(r_i)H_0\}$ between the network device and the terminal device. The network device may obtain, based on the downlink channel information, an IRS array control parameter that maximizes the system sum rate, that is, a control parameter of a reflection unit in the IRS array. A channel design is completed based on the IRS array control parameter. In addition, in a current case, a designed channel can ensure a maximum downlink transmission rate.

However, the network device needs to send downlink data and a downlink signal to the terminal device, and then the terminal device performs channel measurement based on the downlink data and the downlink signal. Then, the terminal device feeds back downlink channel information obtained through measurement to the network device, so that the network device can design the IRS array control parameter based on a measurement result of the downlink channel information. In this process, because downlink cascading channel information in the downlink channel information has a large data amount, a measurement and feedback periodicity is long, efficiency of designing the IRS array parameter is low, and consequently, channel design efficiency of the IRS-MIMO system is low.

(2) Reciprocity

Uplink transmission and downlink transmission of a communication system use a same frequency domain resource. When a time interval between sending an uplink signal and a downlink signal is short enough, it may be considered that channel fading of an uplink channel and channel fading of a downlink channel are basically the same, that is, the uplink channel and the downlink channel have reciprocity. When the uplink channel and the downlink channel have reciprocity, the network device may estimate, by detecting an uplink reference signal sent by the terminal device, channel fading to be experienced by sending the downlink signal.

Optionally, in the IRS-MIMO system, an uplink cascading channel and a downlink cascading channel may also have reciprocity. However, due to a limitation of the IRS array, reciprocity between the uplink cascading channel and the downlink cascading channel is limited within a specific range of an incident angle and a reflection angle. That is, the IRS array has local reciprocity.

Figure 6:
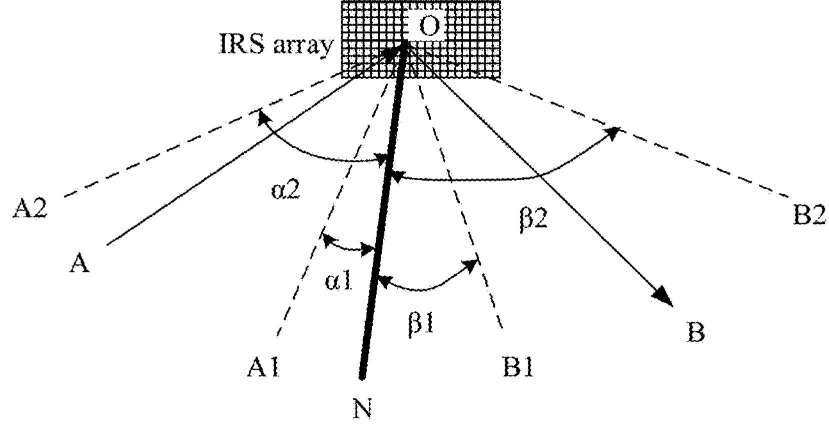
FIG. 6 is a schematic diagram of a reciprocity angle according to an embodiment of this disclosure.

For example, as shown in FIG. 6, NO indicates a normal vector perpendicular to an IRS array plane, AO indicates an incident signal (which may also be described as an incident electromagnetic wave), and OB indicates a reflected signal (which may also be described as a reflected electromagnetic wave). In FIG. 6, both the incident signal received by the IRS array and the reflected transmitting signal are located on an AOB plane. An included angle between AO and ON is an incident angle, and an included angle between ON and OB is a reflection angle. $\alpha$1 indicates a minimum incident angle, $\alpha$2 indicates a maximum incident angle, $\beta$1 indicates a minimum reflection angle, and $\beta$2 indicates a maximum reflection angle. As shown in FIG. 6, when the incident angle is within an angle range of [$\alpha$1, $\alpha$2] and the reflection angle is within an angle range of [$\beta$1, $\beta$2], the uplink cascading channel and the downlink cascading channel have reciprocity.

Figure 7:
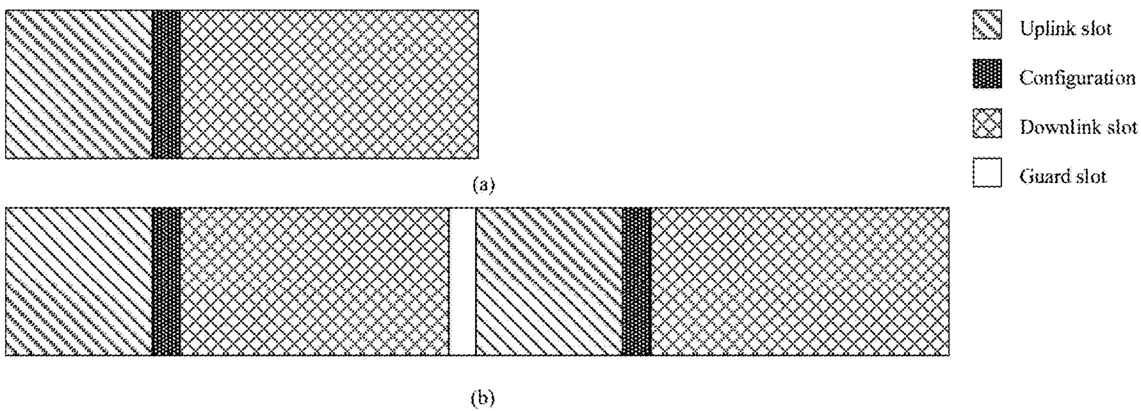
FIG. 7 is a schematic diagram of a frame structure of a resource allocation method in a conventional technology according to an embodiment of this disclosure.

First, a resource allocation method in a conventional technology is described. FIG. 7 is a schematic diagram of a time domain resource configured according to the resource allocation method. As shown in (a) of FIG. 7, by using reciprocity between an uplink cascading channel and a downlink cascading channel, a time domain resource allocation manner is that an uplink slot is first configured, and a network device receives, by using the uplink slot, an uplink reference signal sent by a terminal device. Then, the network device estimates uplink direct channel information and uplink cascading channel information based on the uplink reference signal and a current IRS array parameter. Based on the reciprocity of the channels, an IRS array parameter that can maximize a downlink transmission rate is determined by using the uplink direct channel information and the uplink cascading channel information. Then, the IRS array parameter is transmitted to an IRS array controller on a configured configuration time resource, to complete reconfiguration of the IRS array parameter. Finally, as shown in (a) of FIG. 7, the network device transmits a downlink signal to an IRS array in a configured downlink slot, and the IRS array transmits the downlink signal to the terminal device by using the reconfigured IRS array parameter, to complete downlink transmission.

As shown in (b) of FIG. 7, time domain resources in a plurality of periodicities are configured according to the configuration manner of the time domain resource in one periodicity shown in (a) of FIG. 7. A guard slot of a time advance (TA) used to adjust uplink transmission slot alignment needs to be configured between different periodicities, to ensure that uplink signals sent by terminal devices can reach the network device at a same moment, and ensure orthogonality of the uplink signals between the terminal devices. This helps eliminate uplink signal interference between the terminal devices. The guard slot may be described as a flexible slot or the like. In this case, as shown in (b) of FIG. 7, to configure the guard slot, a part of downlink slot resources need to be occupied, and consequently, utilization of downlink transmission resources is reduced.

Further, the resource allocation method in the conventional technology further has at least the following problems: first, in the resource allocation method, resource allocation is performed based on reciprocity between the uplink cascading channel and the downlink cascading channel. However, it may be learned from the descriptions of the reciprocity above, the reciprocity of the channels can be ensured only when it is ensured that the incident angle and the reflection angle of the signal are within a specific angle range at the IRS array. A limitation of the reciprocity of the channels leads to a specific limitation of the current resource allocation method. Then, allocating the configuration time resource dedicated to configuring the IRS array parameter leads to reduction in utilization of transmission resources. Based on this, a small configuration time resource is allocated in the conventional technology, to alleviate a problem of reduction in utilization of transmission resources. However, the IRS array controller needs to receive and reconfigure the IRS array parameter in a short time period, which increases a requirement on performance of the IRS array controller. Finally, according to an existing frame structure design, for example, a 5G frame structure, a downlink control channel resource is usually configured at a start position of a frame. In this case, the current resource allocation method affects a capacity and reliability of a downlink control channel.

Figure 8:
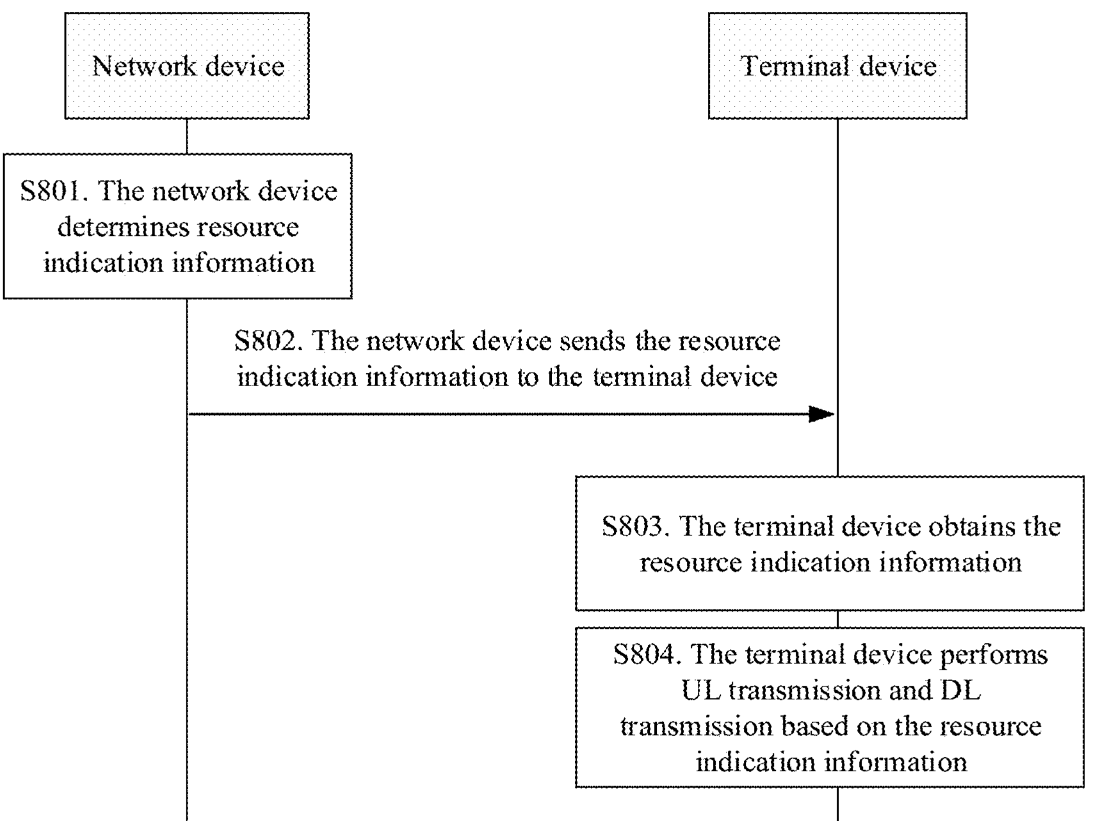
FIG. 8 is a schematic diagram 1 of a resource allocation method according to an embodiment of this disclosure.

Based on this, an embodiment of this disclosure provides a resource allocation method. As shown in FIG. 8, the method may include S801 to S804.

S801. A network device determines resource indication information.

The resource indication information indicates an uplink (UL) transmission resource and a downlink (DL) transmission resource in a flexible slot, and the flexible slot is used to determine an IRS array control parameter. Usually, in a radio frame structure, a guard period used for switching between uplink and downlink transmission modes is configured between an uplink subframe and a downlink subframe. The guard period may be implemented as a flexible slot, and the flexible slot may also be described as a guard slot. Therefore, the IRS array control parameter is set by using the flexible slot, so that existing signal transmission between the network device and a terminal device can be not affected. In addition, a time domain resource used to determine the IRS array control parameter can be flexibly configured, thereby reducing overheads of an IRS-MIMO system.

Figure 9:
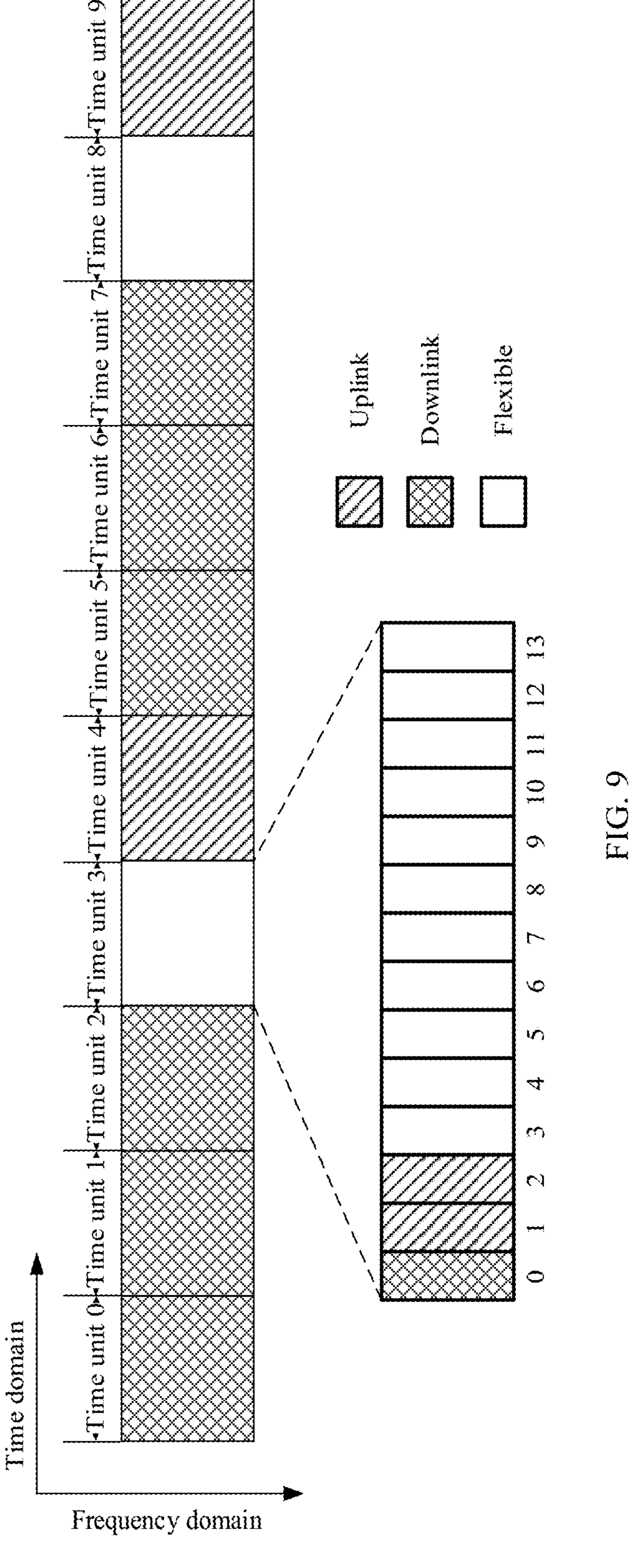
FIG. 9 is a schematic diagram 1 of a frame structure of a resource allocation method according to an embodiment of this disclosure.

Optionally, in a resource mapping manner shown in FIG. 9, a transmission resource scheduled at one time includes one or more consecutive sub-channels in frequency domain (not shown in FIG. 9), and each sub-channel includes a plurality of consecutive resource blocks (RBs) in frequency domain, for example, 10 RBs, and includes one subframe or one slot in time domain. The following uses a slot as an example for description.

For example, FIG. 9 is a schematic diagram 1 of a time domain resource according to an embodiment of this disclosure. As shown in FIG. 9, a resource pool corresponding to the terminal device includes a time unit 0, a time unit 1, a time unit 2, a time unit 3, a time unit 4, a time unit 5, a time unit 6, a time unit 7, a time unit 8, a time unit 9, . . .

The resource pool may include one or more consecutive sub-channels in frequency domain, and one sub-channel may include several consecutive RBs in frequency domain. One time unit may include one or more small time units in time domain, and the time unit may be a time unit formed by a plurality of possible time granularities such as a slot, a mini-slot, a subframe, a radio frame, and a transmission time interval (TTI). It should be understood that a bandwidth of the time unit is not limited to some embodiments. A quantity of sub-channels included in the time unit and a size of each sub-channel may be configured or preconfigured by the network device.

For example, as shown in FIG. 9, an example in which one time unit is one slot in time domain is used for description. The slot includes 14 symbols, and the 14 symbols are sequentially numbered from left to right from 0 to 13. In the 14 symbols, any symbol may be configured or preconfigured by the network device as a symbol (also referred to as a UL symbol) that includes a UL transmission resource, a symbol (also referred to as a DL symbol) that includes a DL transmission resource, and/or a symbol for a guard period and/or automatic gain control. The symbol for the guard period and/or the automatic gain control may be used by the terminal device to perform transceiver conversion or automatic gain control, and may also be referred to as a flexible symbol. For example, as shown in FIG. 9, a symbol with a symbol number 0 is configured as a DL symbol, and symbols with a symbol number 1 and a symbol number 2 are configured as UL symbols.

Figure 10A:
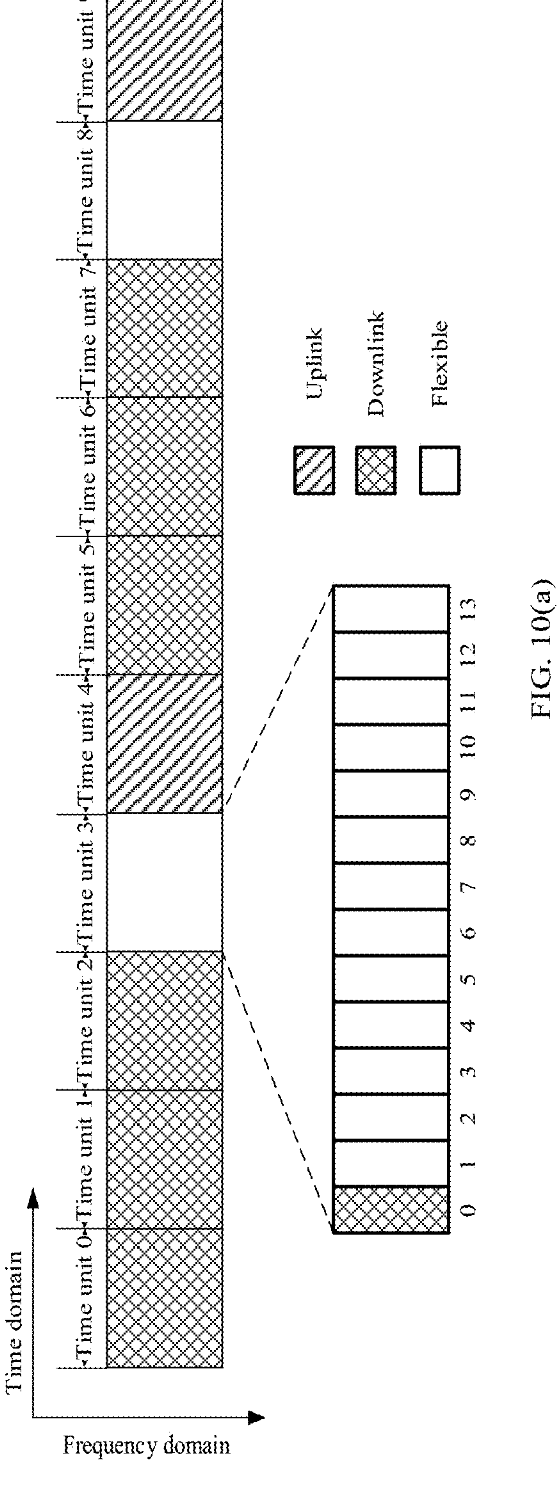
FIG. 10(*a*) and FIG. 10(*b*) are a schematic diagram 2 of a frame structure of a resource allocation method according to an embodiment of this disclosure.
Figure 10B:
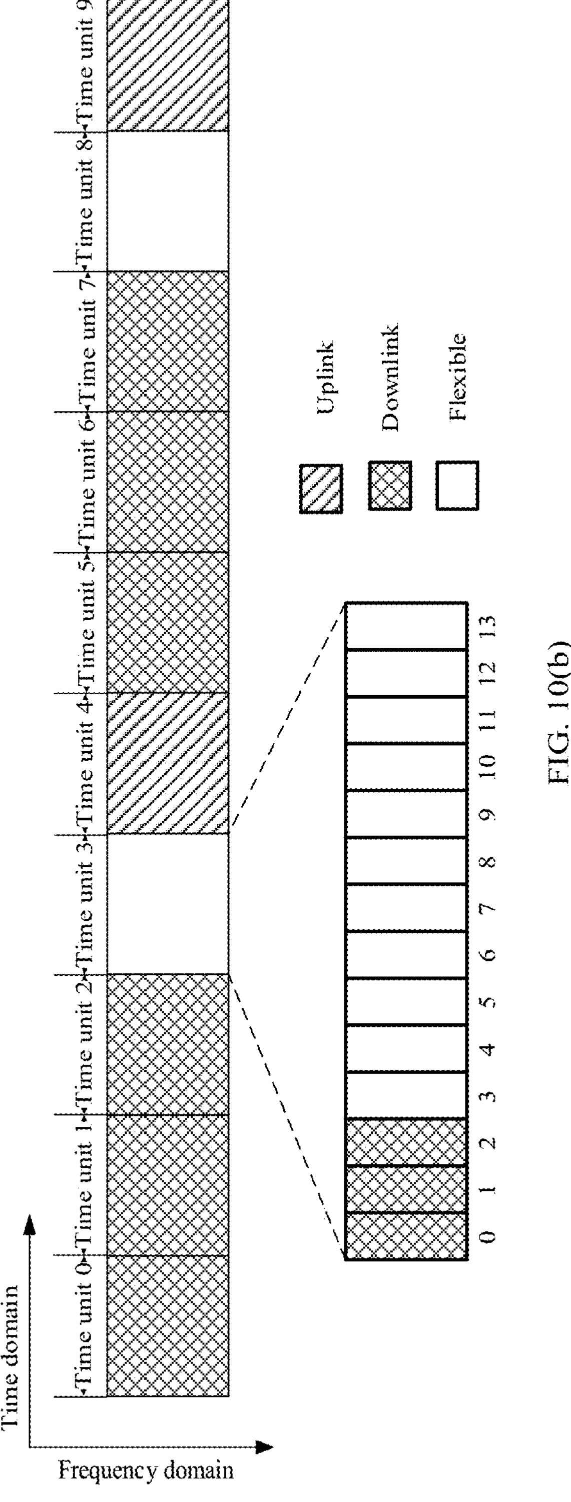

Optionally, the network device configures, as a DL symbol, at least the first symbol starting in time domain in the flexible slot used to determine the IRS array control parameter, to transmit the resource indication information to the terminal device, where the resource indication information may be downlink control information (DCI). As shown in FIG. 10(*a*), a symbol with a symbol number 0 is configured as a DL symbol. The resource indication information indicates a start position and a quantity of UL symbols and a start position and a quantity of DL symbols in the flexible slot.

The quantity of DL symbols required by the resource indication information is determined by the network device based on one or more of the following items: a quantity of antennas of the network device, a quantity of antennas of the terminal device, a quantity of terminal devices, a quantity of IRS arrays, and a quantity of reflection units in the IRS array. In other words, the network device uses the first flexible symbol to the $(1+i)^{th}$ flexible symbol in the flexible slot to transmit the resource indication information, where i is a natural number. The network device may set a value of i based on a data amount size of the resource indication information.

For example, as shown in FIG. 10(*b*), the network device configures three symbols with a symbol number 0 to a symbol number 2 as DL symbols, to transmit the resource indication information.

Optionally, before determining the resource indication information, the network device first needs to determine whether an uplink cascading channel and a downlink cascading channel between the network device and the terminal device have reciprocity. Different resource configuration manners may be determined based on different reciprocity, to efficiently determine the IRS array control parameter, and improve channel design efficiency.

For example, the network device presets that the uplink cascading channel and the downlink cascading channel between the network device and the terminal device have no reciprocity. Alternatively, the network device determines, based on position information of the terminal device, whether the uplink cascading channel and the downlink cascading channel between the network device and the terminal device have reciprocity.

As described above on the reciprocity, the network device may obtain an incident angle range and a reflection angle range that enable the uplink cascading channel and the downlink cascading channel to have the reciprocity. The network device predicts a reflected signal angle of the IRS array based on IRS array distribution, terminal device distribution, and an incident signal angle. Further, the network device determines whether an incident angle of an uplink signal is within the incident angle range and whether a reflection angle is within the reflection angle range. The network device determines whether an incident angle of a downlink signal is within the incident angle range and whether the reflection angle is within the reflection angle range. Therefore, the network device determines whether the uplink cascading channel and the downlink cascading channel have the reciprocity.

In some embodiments, the uplink cascading channel and the downlink cascading channel between the network device and the terminal device have the reciprocity. The resource indication information includes first indication information, and the first indication information includes first resource configuration information. The first resource configuration information is used to configure a first UL transmission resource and a first DL transmission resource. The first UL transmission resource includes a first time period, the first DL transmission resource includes a second time period, the first time period is earlier than the second time period, and a quantity of symbols included in the first time period and a quantity of symbols included in the second time period are the same or different.

The uplink cascading channel and the downlink cascading channel have the reciprocity. For example, the IRS array control parameter is described above. The network device may determine the IRS array control parameter based on an uplink reference signal sent by the terminal device. Therefore, when resources in the flexible slot are configured, a UL resource used to transmit the uplink reference signal is first configured, and then a DL resource used to transmit an IRS array control parameter and a downlink signal is configured.

Figure 11A:
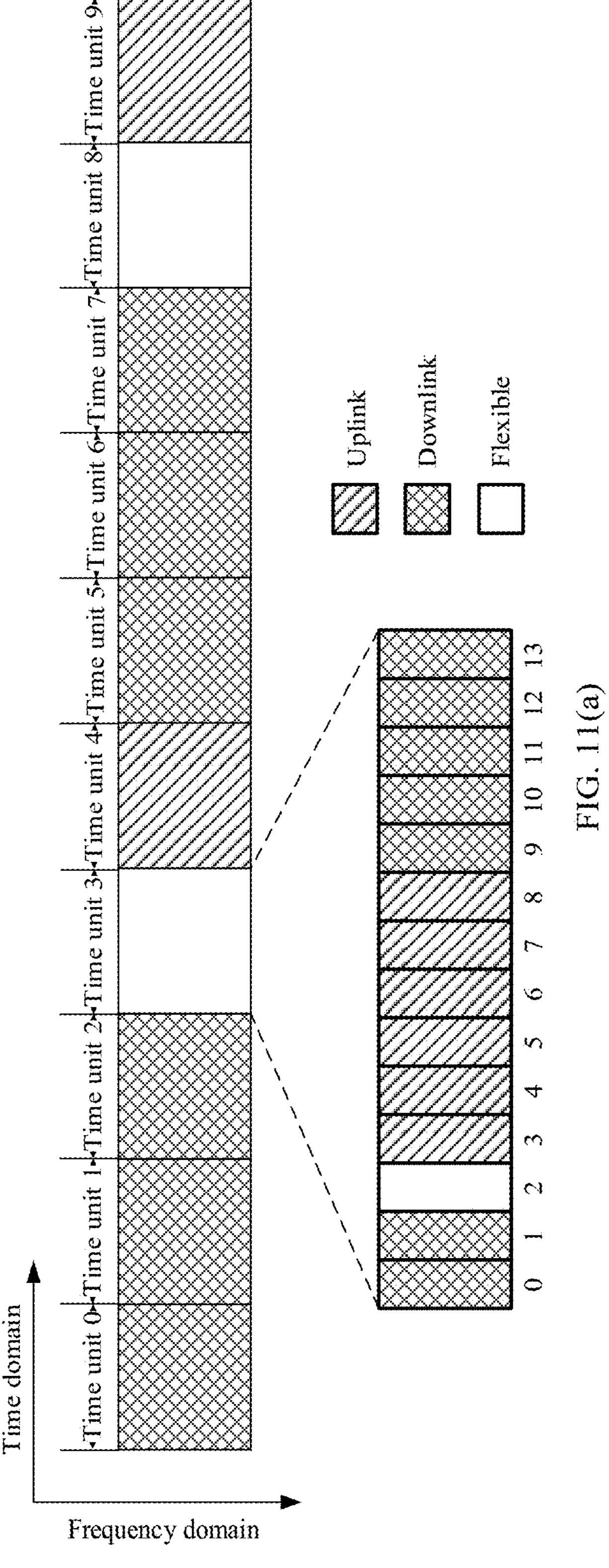
FIG. 11(*a*) and FIG. 11(*b*) are a schematic diagram 3 of a frame structure of a resource allocation method according to an embodiment of this disclosure.
Figure 11B:
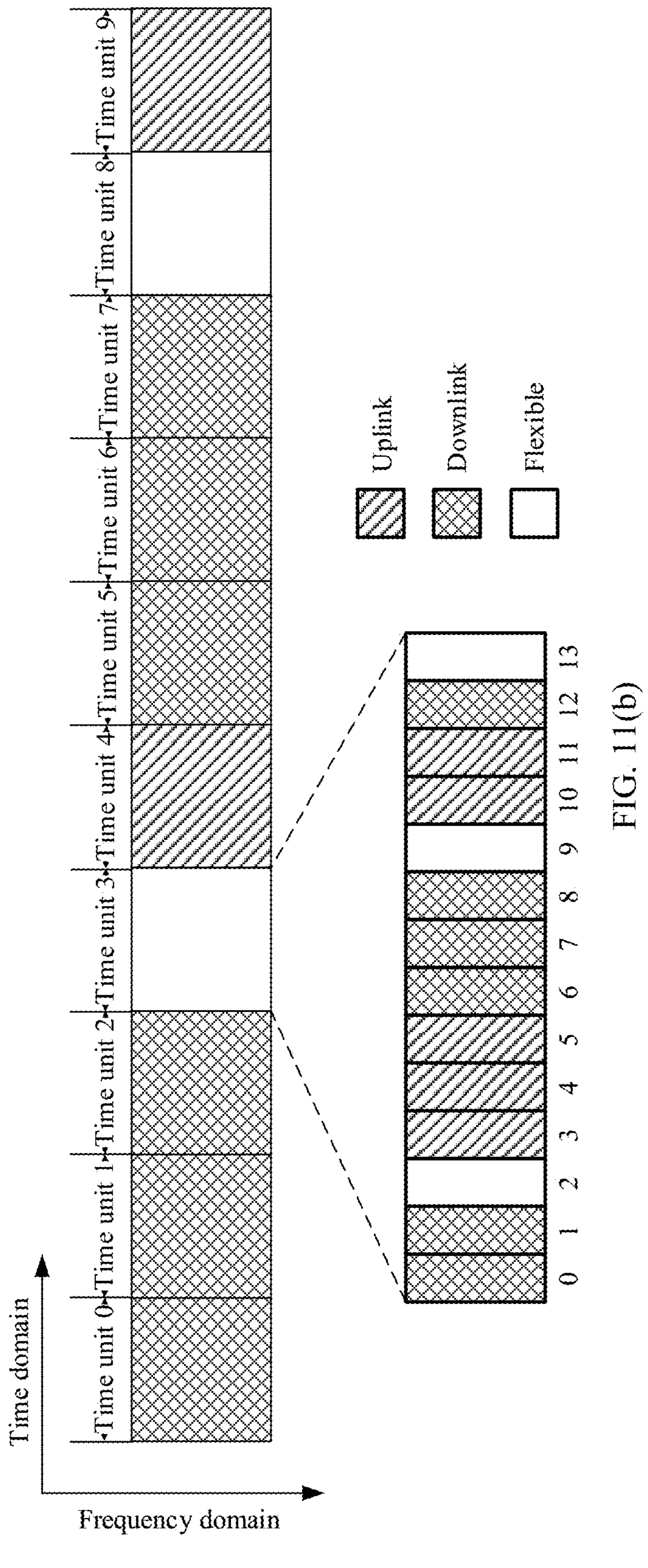

For example, the network device may configure one or more consecutive earlier symbols in symbols other than a symbol used to transmit the resource indication information in the flexible slot as UL symbols, and configure a remaining symbol as a DL symbol. As shown in FIG. 11(*a*), symbols with a symbol number 0 and a symbol number 1 are configured as DL symbols, to transmit the resource indication information. Symbols with a symbol number 3 to a symbol number 8 are configured as UL symbols, that is, the first time period includes six UL symbols. Symbols with a symbol number 9 to a symbol number 13 are configured as DL symbols, that is, the second time period includes five DL symbols. A symbol with a symbol number 2 is configured as a flexible symbol, to convert a downlink transmission mode to an uplink transmission mode. That is, the first time period is earlier than the second time period in time domain, and a length of the first time period is the same as or different from a length of the second time period.

For another example, the network device may alternately configure symbols in the flexible slot except symbols used to transmit the resource indication information as UL symbols and DL symbols, and ensure that the UL symbols are configured first. As shown in FIG. 11(*b*), symbols with a symbol number 0 and a symbol number 1 are configured as DL symbols, to transmit the resource indication information. Symbols with a symbol number 3 to a symbol number 5 are configured as UL symbols, that is, the first time period includes three UL symbols. Symbols with a symbol number 6 to a symbol number 8 are configured as DL symbols, that is, the second time period includes three DL symbols. Symbols with a symbol number 10 and a symbol number 11 are configured as UL symbols, that is, another first time period includes two UL symbols. A symbol with a symbol number 12 is configured as a DL symbol, that is, another second time period includes one DL symbol. Symbols with a symbol number 2 and a symbol number 9 are configured as flexible symbols, to convert a downlink transmission mode to an uplink transmission mode. The network device may complete an IRS array determining process by determining the first 13 symbols, and configure a symbol with a symbol number 13 as a flexible symbol. Alternatively, a symbol with a symbol number 13 is used to convert the downlink transmission mode to the uplink transmission mode, to reduce impact on a time unit 4 in an uplink transmission resource.

In some other embodiments, the uplink cascading channel and the downlink cascading channel between the network device and the terminal device have no reciprocity, the resource indication information includes second indication information, and the second indication information includes second resource configuration information. The second resource configuration information is used to configure a second DL transmission resource and a second UL transmission resource. The second DL transmission resource includes a third time period, the second UL transmission resource includes a fourth time period, the third time period is earlier than the fourth time period, and a quantity of symbols included in the third time period and a quantity of symbols included in the fourth time period are the same or different.

The uplink cascading channel and the downlink cascading channel have no reciprocity. For example, the IRS array control parameter is described above. The network device needs to design the IRS array control parameter based on a downlink channel measurement result. Therefore, when resources in the flexible slot are configured, a DL resource used to transmit a downlink signal and downlink data is first configured, and then a UL resource used to transmit an uplink signal and uplink data is configured.

Further, in the downlink channel measurement result, downlink cascading channel information has a large data amount. If all terminal devices participate in measurement, a measurement periodicity is long, and channel design efficiency is reduced. Therefore, some of target terminal devices may participate in determining the IRS array control parameter. The network device receives request information sent by the target terminal device. The request information is used to request to participate in a process of determining the IRS array control parameter. The target terminal device is at least one terminal device in the terminal device. For example, if a terminal device moves to a cell edge and needs to perform channel optimization, the terminal device sends request information to the network device. Alternatively, if a terminal device needs to obtain better communication quality and needs to perform channel optimization, the terminal device needs to send request information to the network device.

Based on this, the network device may determine the target terminal device based on the received request information, and further determine the terminal device to which the resource indication information needs to send.

In addition, in the current scenario, the quantity of DL symbols required by the resource indication information is determined by the network device based on one or more of the following items: a quantity of antennas of the network device, a quantity of antennas of the target terminal device, a quantity of target terminal devices, a quantity of IRS arrays, and a quantity of reflection units in the IRS array.

Figure 12A:
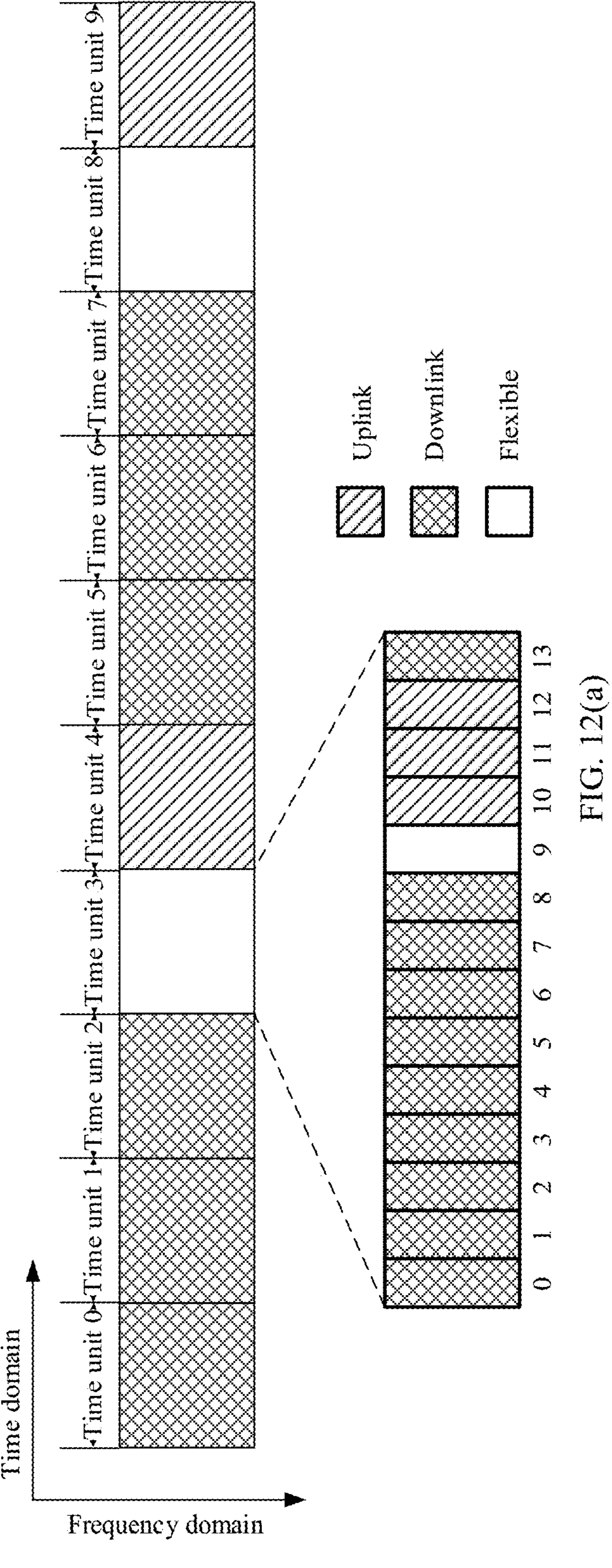
FIG. 12(*a*) and FIG. 12(*b*) are a schematic diagram 4 of a frame structure of a resource allocation method according to an embodiment of this disclosure.
Figure 12B:
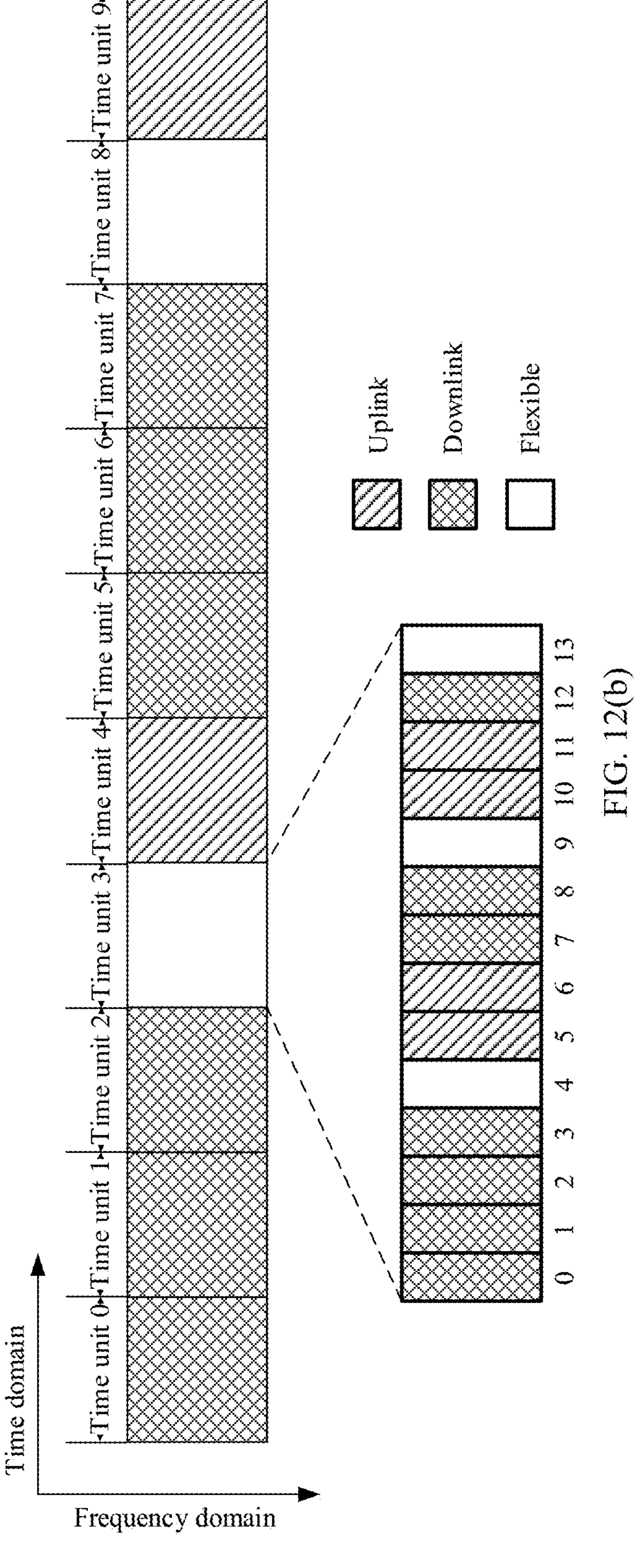

For example, the network device may configure one or more consecutive earlier symbols in symbols other than a symbol used to transmit the resource indication information in the flexible slot as DL symbols, and configure a remaining symbol as a UL symbol. As shown in FIG. 12(*a*), symbols with a symbol number 0 and a symbol number 1 are configured as DL symbols, to transmit the resource indication information. Symbols with a symbol number 2 to a symbol number 8 are configured as DL symbols, that is, the third time period includes seven DL symbols. Symbols with a symbol number 10 to a symbol number 12 are configured as UL symbols, that is, the fourth time period includes three UL symbols. A symbol with a symbol number 9 is configured as a flexible symbol, to convert a downlink transmission mode to an uplink transmission mode. A symbol with a symbol number 13 is configured as a DL symbol, to transmit, to the IRS array, the IRS array control parameter determined by the network device.

For another example, the network device may alternately configure symbols in the flexible slot except symbols used to transmit the resource indication information as DL symbols and UL symbols, and ensure that the DL symbols are configured first. As shown in FIG. 12(*b*), symbols with a symbol number 0 and a symbol number 1 are configured as DL symbols, to transmit the resource indication information. Symbols with a symbol number 2 and a symbol number 3 are configured as DL symbols, that is, the third time period includes two UL symbols. Symbols with a symbol number 5 and a symbol number 6 are configured as UL symbols, that is, the fourth time period includes two UL symbols. Symbols with a symbol number 7 and a symbol number 8 are configured as DL symbols, that is, another third time period includes two DL symbols. Symbols with a symbol number 10 and a symbol number 11 are configured as UL symbols, that is, another fourth time period includes two UL symbols. Symbols with a symbol number 4 and a symbol number 9 are configured as flexible symbols, to convert a downlink transmission mode to an uplink transmission mode. A symbol with a symbol number 12 is configured as a DL symbol, to transmit, to the IRS array, the IRS array control parameter determined by the network device. The network device may complete an IRS array determining process by determining the first 13 symbols, and configure a symbol with a symbol number 13 as a flexible symbol. Alternatively, a symbol with a symbol number 13 is used to convert the downlink transmission mode to the uplink transmission mode, to reduce impact on a time unit 4 in an uplink transmission resource.

In a possible implementation, the second UL transmission resource further includes physical uplink shared channel (PUSCH) resource information configured by the network device for the target terminal device, and a PUSCH resource is used to transmit first channel information. The first channel information includes downlink direct channel information and downlink cascading channel information.

When the terminal device has no data transmission requirement, the network device configures only a physical uplink control channel (PUCCH) resource for the terminal device, to transmit control information. A PUCCH has a small capacity, and cannot complete independent transmission of the first channel information. Therefore, the network device further needs to configure the PUSCH resource for the target terminal device. If there are a plurality of target terminal devices, the plurality of target terminal devices may perform transmission in a multiplexing mode on allocated UL symbols by using a PUSCH and a PUCCH.

Optionally, the resource indication information further indicates a quantity of flexible slots for determining the IRS array control parameter. If the quantity of IRS arrays and/or the quantity of reflection units in the IRS array are/is large, the process of determining the IRS array control parameter may not be completed by using one flexible slot resource. In this case, the network device needs to configure a plurality of flexible slot resources to determine the IRS array control parameter. An allocation manner of a UL resource and a DL resource in each flexible slot is described above. Allocation results of UL resources and DL resources in various flexible slots are the same or different.

In some embodiments, the network device configures the first i symbols in the first flexible slot in time domain in the plurality of flexible slots used to determine the IRS array control parameter as a DL resource used to transmit the resource indication information. The resource indication information includes a quantity of flexible slots and an allocation result of the UL resource and the DL resource in each flexible slot. In this case, the DL resource used to transmit the resource indication information does not need to be configured in several subsequent flexible slots.

For example, it is assumed that the uplink cascading channel and the downlink cascading channel between the network device and the terminal device have no reciprocity, and the network device needs to determine control parameters of two IRS arrays, that is, an IRS array 1 and an IRS array 2. As shown in (a) or (b) of FIG. 13, the network device determines that resources of three flexible slots (that is, a time unit 3, a time unit 8, and a time unit 13) need to be allocated to determine the control parameters of the IRS array 1 and the IRS array 2. Allocation results of UL resources and DL resources in the three flexible slots are the same or different.

Figure 13:
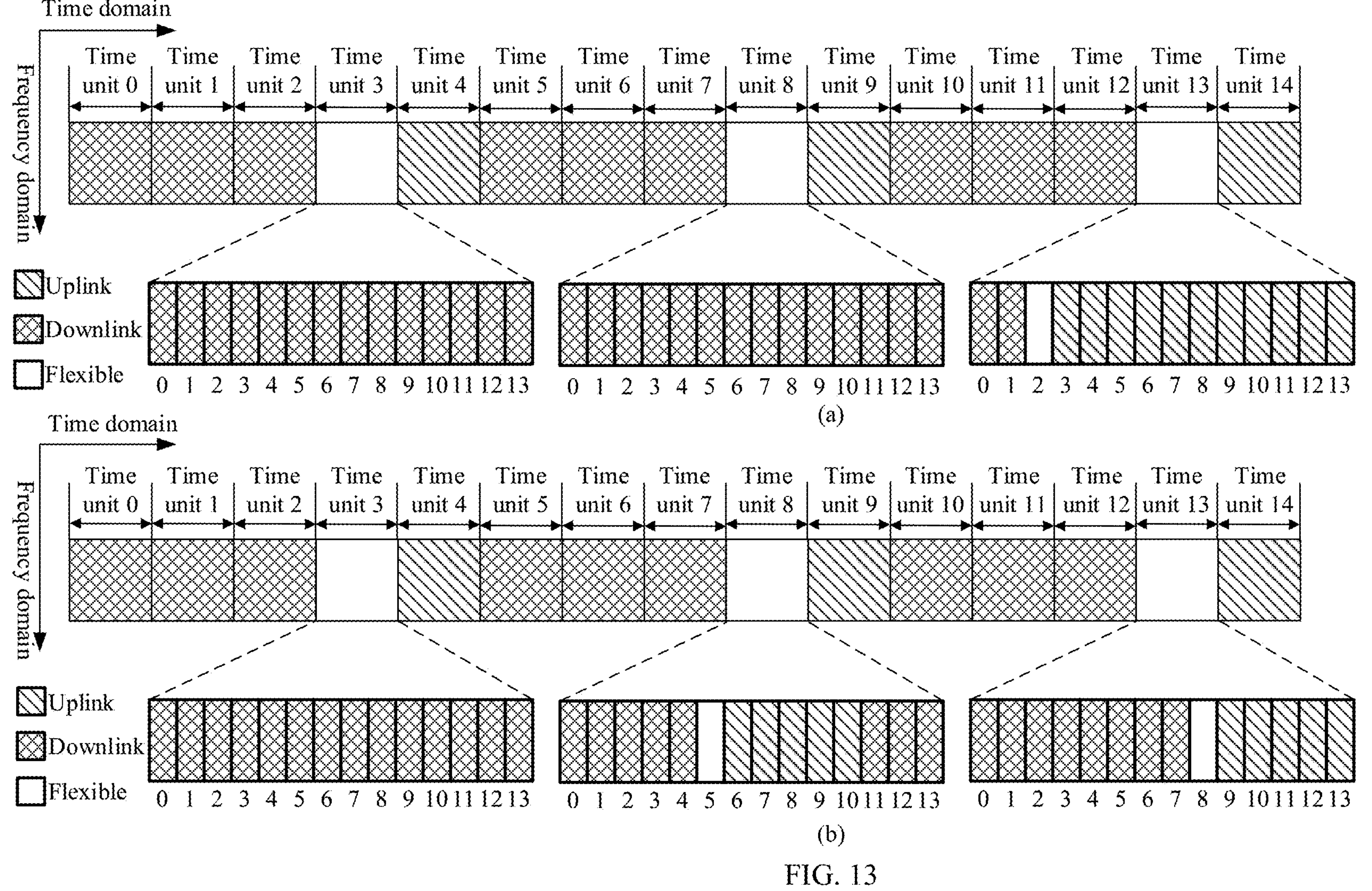
FIG. 13 is a schematic diagram 5 of a frame structure of a resource allocation method according to an embodiment of this disclosure.

For example, as shown in (a) of FIG. 13, the network device configures the DL resource in the first flexible slot (that is, the time unit 3) and the second flexible slot (that is, the time unit 8), and does not need to feed back a downlink channel measurement result, that is, does not need to configure a resource used to transmit the first channel information. A partial DL resource and a partial UL resource are configured in the third flexible slot (that is, the time unit 13), that is, both downlink channel measurement and a feedback of a downlink channel measurement result are taken into consideration.

In this way, the process of determining the control parameters of the two IRS arrays is completed in the third flexible slot, thereby avoiding reducing resource utilization caused by repeated adjustment of the uplink and downlink transmission modes in the process of determining the IRS array control parameter.

For another example, as shown in (b) of FIG. 13, the network device configures the DL resource in the first flexible slot (that is, the time unit 3), and does not need to feed back a downlink channel measurement result, and the DL resource is mainly used to measure a downlink channel of the IRS array 1. Symbols with a symbol number 6 to a symbol number 10 in the second flexible slot (that is, the time unit 8) are configured as UL symbols, to feed back a downlink channel measurement result of the IRS array 1, and then a process of determining the control parameter of the IRS array 1 is first completed. A DL resource and a UL resource are configured in the third flexible slot (that is, the time unit 13), and are used to complete a process of determining the control parameter of the IRS array 2.

In this way, if a quantity of IRS arrays in a cell and/or a quantity of reflection units in the IRS array are/is large, the process of determining the IRS array control parameter may be gradually completed. An IRS array whose control parameter has been updated or a control unit whose control parameter has been updated in the IRS array may gradually participate in an uplink and downlink signal transmission process, thereby gradually improving channel performance and shortening a channel design periodicity of an IRS-MIMO system.

Further, in the resource configuration manner shown in (a) or (b) of FIG. 13, it may be learned that if the network device determines that the plurality of flexible slots need to be configured to determine the IRS array control parameter, symbols in the first flexible slot in time domain may be configured as a same transmission resource. As shown in (a) of FIG. 13, all resources in the first flexible slot are configured as DL resources. In other words, only the second DL transmission resource is configured in the first flexible slot, and the second UL transmission resource is not configured. That is, the first flexible slot includes only the third time period, and does not include the fourth time period. Correspondingly, symbols in the last flexible slot in time domain may also be configured as UL transmission resources to transmit the downlink channel measurement result. In this case, only the second UL transmission resource is configured in the last flexible slot, and the second DL transmission resource is not configured. That is, the last flexible slot includes only the fourth time period, and does not include the third time period.

Similarly, when the uplink cascading channel and the downlink cascading channel have the reciprocity, if a plurality of flexible slots also need to be configured to determine the IRS array control parameter, the network device may configure, in the first flexible slot, only the first DL transmission resource used to transmit the resource indication information, and does not configure the first UL transmission resource. That is, the first flexible slot includes only the first time period, and does not include the second time period. Correspondingly, symbols in the last flexible slot in time domain may also be configured as DL transmission resources, and are used to transmit the determined IRS array control parameter, the downlink signal, and the downlink data. In this case, only the first DL transmission resource is configured in the last flexible slot, and the first UL transmission resource is not configured. That is, the last flexible slot includes only the second time period, and does not include the first time period.

Optionally, the network device needs to configure an IRS array control parameter for a plurality of terminal devices. In addition, for the IRS array, a first uplink cascading channel and a first downlink cascading channel between a first terminal device and the network device in the plurality of terminal devices have reciprocity, and a second uplink cascading channel and a second downlink cascading channel between a second terminal device and the network device have no reciprocity. In this case, quantity thresholds of the first terminal device and the second terminal device may be preconfigured. For example, the quantity threshold is 80%.

In some embodiments, a quantity of first terminal devices exceeds 80% of a quantity of all terminal devices. In this case, the network device sets the IRS array control parameter, so that the first uplink cascading channel and the first downlink cascading channel have the reciprocity, and the second uplink cascading channel and the second downlink cascading channel have the reciprocity. Then, the network device may determine the resource indication information according to the method described in the foregoing scenario in which the uplink cascading channel and the downlink cascading channel have the reciprocity.

In some other embodiments, a quantity of second terminal devices exceeds 80% of a quantity of all terminal devices. In this case, the network device may determine the resource indication information according to the method described in the foregoing scenario in which the uplink cascading channel and the downlink cascading channel have no reciprocity.

In this way, in a scenario in which reciprocity of uplink cascading channels and downlink cascading channels of the plurality of terminal devices is different and the IRS array control parameter needs to be determined, channel design efficiency can also be improved.

S802. The network device sends the resource indication information to the terminal device.

Optionally, the network device sends the resource indication information to the device terminal, so that the terminal device needs to determine a flexible slot used to determine the IRS array control parameter and resources, in the flexible slot, that may be used for UL transmission and DL transmission.

The network device sends first signaling to the terminal device, where the first signaling includes the resource indication information, and the first signaling includes at least one of radio resource control (RRC) signaling, media access control (MAC) signaling, or physical layer signaling. Therefore, the terminal device may configure a UL transmission resource and a DL transmission resource in the flexible slot based on resources indicated by the first signaling. In addition, the network device may further determine different resource indication information based on information such as a current position of the terminal device, an IRS array that needs to be used, and an IRS array configuration, and flexibly indicate resources in the flexible slot in real time based on a requirement of the terminal device, thereby improving channel design efficiency.

It should be noted that if the network device determines the resource indication information based on the request information sent by the terminal device, in step S802, the network device sends the resource indication information to the target terminal device. That is, only the target terminal device needs to perform downlink channel measurement.

S803. The terminal device obtains the resource indication information.

The terminal device receives the resource indication information sent by the network device, to complete a configuration of the UL resource and the DL resource in the flexible slot.

S804. The terminal device performs UL transmission and DL transmission based on the resource indication information.

Optionally, the terminal device completes the configuration of the UL resource and the DL resource in the flexible slot in step S803, and then the terminal device may perform UL transmission and DL transmission based on a configuration result. It can be learned from step S801 that in two scenarios in which the uplink cascading channel and the downlink cascading channel between the network device and the terminal device have the reciprocity and have no reciprocity, resource indication information is different. In this case, the following separately describes in detail an implementation of step S804 in the two scenarios.

Figure 14:
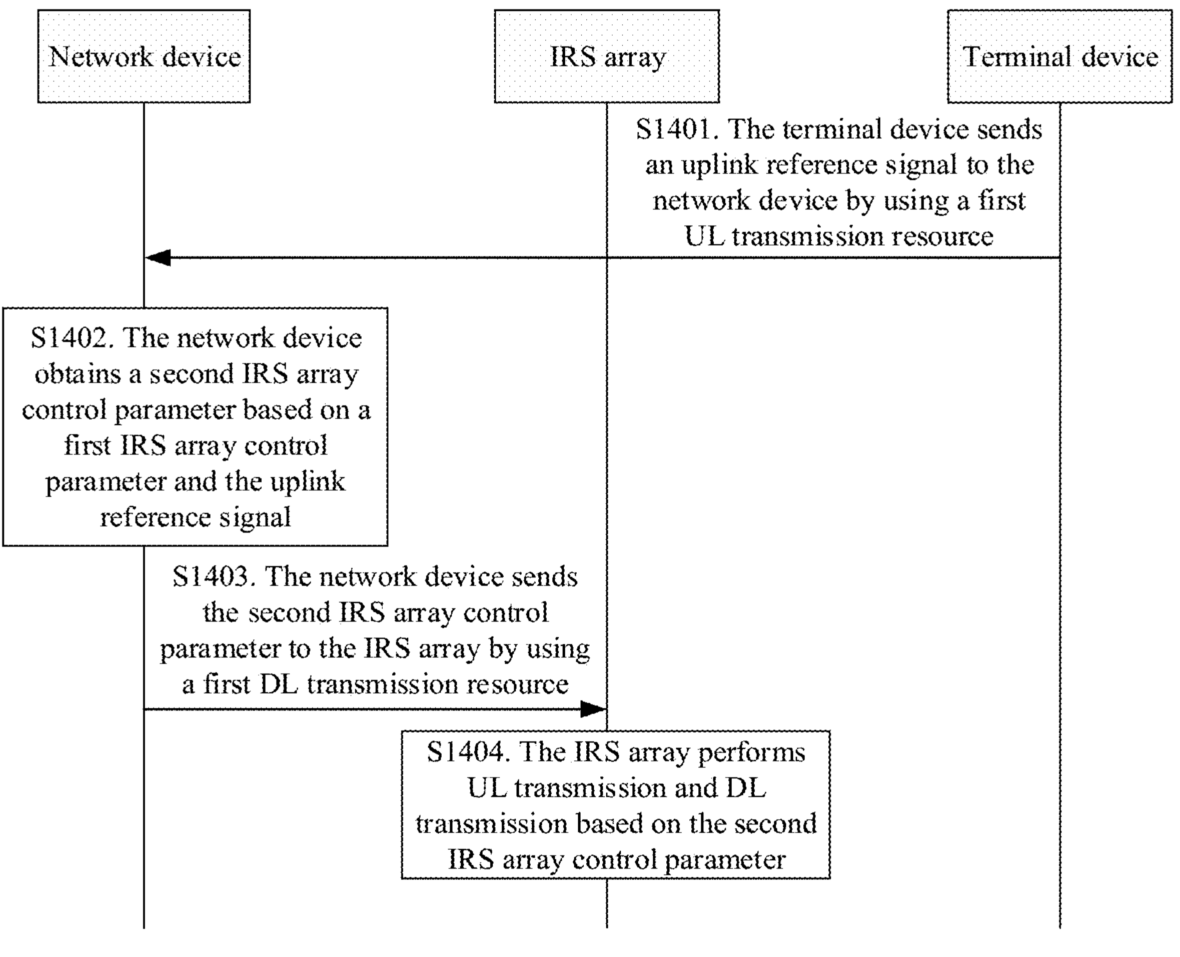
FIG. 14 is a schematic diagram 2 of a resource allocation method according to an embodiment of this disclosure.

In some embodiments, the uplink cascading channel and the downlink cascading channel between the network device and the terminal device have the reciprocity. As shown in FIG. 14, step S804 may be implemented as step S1401 to step S1404.

S1401. A terminal device sends an uplink reference signal to a network device by using a first UL transmission resource.

S1402. The network device obtains a second IRS array control parameter based on a first IRS array control parameter and the uplink reference signal.

The first IRS array control parameter is a historical control parameter of an IRS array or a control parameter preconfigured by the network device for the IRS array. This is not limited to some embodiments.

Optionally, in step S1401 and step S1402, the resource indication information received by the terminal device includes first indication information, and in addition to the first resource configuration information described in step S801, the first indication information may further include the first IRS array control parameter. In this case, the IRS array reflects the uplink reference signal based on the first IRS array control parameter.

For example, as shown in FIG. 11(*a*), symbols with a symbol number 3 to a symbol number 8 are the first UL transmission resource.

S1403. The network device sends the second IRS array control parameter to the IRS array by using a first DL transmission resource.

For example, as shown in FIG. 11(*a*), symbols with a symbol number 9 to a symbol number 13 are the first DL transmission resource.

S1404. The IRS array performs UL transmission and DL transmission based on the second IRS array control parameter.

After the IRS array completes setting of the second IRS array control parameter, an uplink channel and a downlink channel are designed. The IRS array may reflect a received uplink signal and a received downlink signal based on the second IRS array control parameter, to further implement UL transmission and DL transmission.

Figure 15:
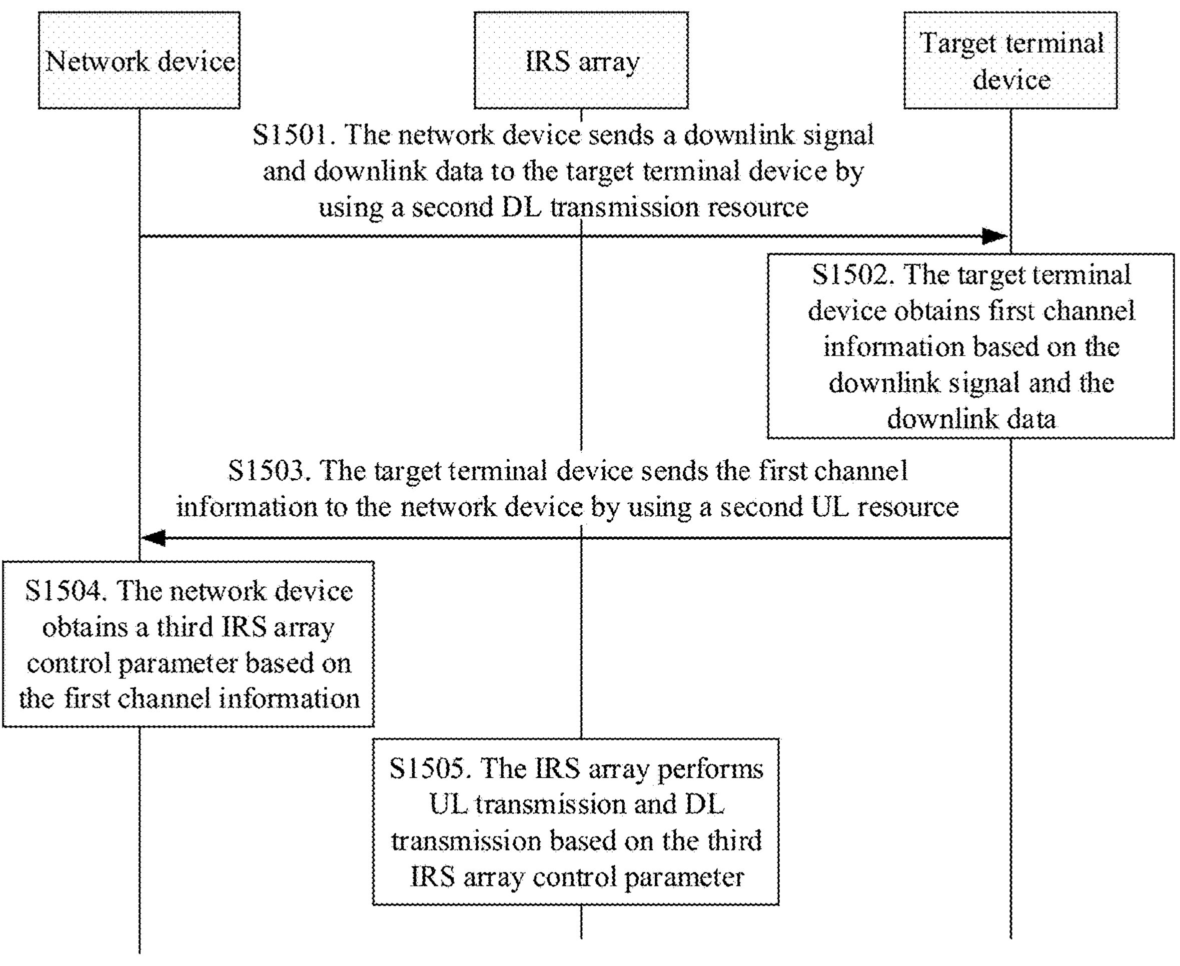
FIG. 15 is a schematic diagram 3 of a resource allocation method according to an embodiment of this disclosure.

In some embodiments, the uplink cascading channel and the downlink cascading channel between the network device and the terminal device have no reciprocity. As shown in FIG. 15, step S804 may be implemented as step S1501 to step S1505.

S1501. A network device sends a downlink signal and downlink data to a target terminal device by using a second DL transmission resource.

For example, as shown in FIG. 12(*a*), symbols with a symbol number 2 to a symbol number 8 are the second DL transmission resource.

S1502. The target terminal device obtains first channel information based on the downlink signal and the downlink data.

The first channel information includes downlink direct channel information and downlink cascading channel information.

S1503. The target terminal device sends the first channel information to the network device by using a second UL resource.

For example, as shown in FIG. 12(*a*), symbols with a symbol number 10 to a symbol number 12 are the second UL transmission resource.

S1504. The network device obtains a third IRS array control parameter based on the first channel information.

S1505. An IRS array performs UL transmission and DL transmission based on the third IRS array control parameter.

After the IRS array completes setting of the third IRS array control parameter, an uplink channel and a downlink channel are designed. The IRS array may reflect a received uplink signal and a received downlink signal based on the third IRS array control parameter, to further implement UL transmission and DL transmission.

Optionally, in step S801, in a process in which the network device determines whether the uplink cascading channel and the downlink cascading channel between the network device and the terminal device have reciprocity, there is a manner in which it is preset that the uplink cascading channel and the downlink cascading channel have no reciprocity. In this case, the network device determines resource indication information in the current scenario, and determines the third IRS array control parameter by using step S1501 to step S1505. Then, the network device determines again, based on the third IRS array control parameter, whether the uplink cascading channel and the downlink cascading channel have the reciprocity. If the reciprocity exists, when an IRS array control parameter needs to be determined subsequently, the network device determines resource indication information according to the method described in the scenario with the reciprocity. If the reciprocity does not exist, the network device determines resource indication information according to the method described in the foregoing scenario without the reciprocity.

Therefore, in the resource allocation method provided in this disclosure, the IRS array control parameter can be determined by using the flexible slot resource, and transmission of the uplink data and the downlink data is not affected. In addition, resource utilization in the existing frame structure is not reduced.

The resource allocation methods provided in embodiments of this disclosure are described in detail above with reference to FIG. 8, FIG. 14, and FIG. 15. Resource allocation apparatuses provided in embodiments of this disclosure are described in detail below with reference to FIG. 16, FIG. 17, FIG. 18, FIG. 19, and FIG. 20.

Figure 16:
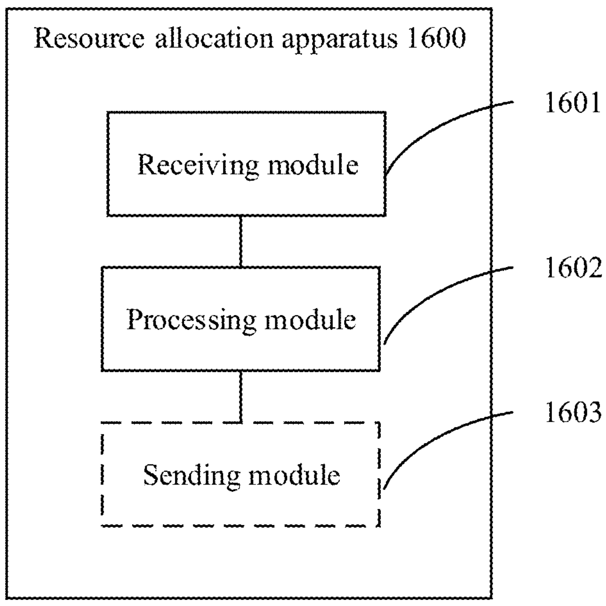
FIG. 16 is a schematic structural diagram 1 of a resource apparatus according to an embodiment of this disclosure.

For example, FIG. 16 is a schematic structural diagram 1 of a resource allocation apparatus according to an embodiment of this disclosure. As shown in FIG. 16, a resource allocation apparatus 1600 includes a receiving module 1601 and a processing module 1602. The resource allocation apparatus 1600 may be configured to implement functions of the terminal device in the foregoing method embodiments. The resource allocation apparatus 1600 may be an independent terminal device, for example, a handheld terminal device, a vehicle-mounted terminal device, or vehicle user equipment, or may be a chip or a chip system included in the terminal device.

The receiving module 1601 is configured to obtain resource indication information.

The resource indication information indicates an UL transmission resource and a DL transmission resource in a flexible slot, and the flexible slot is used to determine an IRS array control parameter.

The processing module 1602 is configured to perform UL transmission and DL transmission based on the resource indication information.

In a possible implementation, an uplink cascading channel and a downlink cascading channel between the resource allocation apparatus 1600 and a network device have reciprocity.

Optionally, the resource indication information includes first indication information, the first indication information includes first resource configuration information, the first resource configuration information is used to configure a first UL transmission resource and a first DL transmission resource, the first UL transmission resource includes a first time period, the first DL transmission resource includes a second time period, the first time period is earlier than the second time period, and a quantity of symbols included in the first time period and a quantity of symbols included in the second time period are the same or different.

In a possible implementation, the first indication information further includes a first IRS array control parameter. The resource allocation apparatus 1600 further includes a sending module 1603.

The sending module 1603 is configured to send an uplink reference signal to the network device by using the first UL transmission resource, so that the network device obtains a second IRS array control parameter based on the first IRS array control parameter and the uplink reference signal.

The receiving module 1601 is further configured to receive, by using the first DL transmission resource, a first downlink signal and/or first downlink data that are/is reflected by an IRS array based on the second IRS array control parameter.

In a possible implementation, an uplink cascading channel and a downlink cascading channel between the resource allocation apparatus 1600 and a network device have no reciprocity.

Optionally, the resource indication information includes second indication information, the second indication information includes second resource configuration information, the second resource configuration information is used to configure a second DL transmission resource and a second UL transmission resource, the second DL transmission resource includes a third time period, the second UL transmission resource includes a fourth time period, the third time period is earlier than the fourth time period, and a quantity of symbols included in the third time period and a quantity of symbols included in the fourth time period are the same or different.

In a possible implementation, the resource allocation apparatus 1600 is used for a target terminal device, and the target terminal device is at least one device in the terminal device. The resource allocation apparatus 1600 further includes a sending module 1603.

The sending module 1603 is configured to send request information to the network device. The request information is used to request to participate in a process of determining the IRS array control parameter.

In a possible implementation, the receiving module 1601 is further configured to receive, by using the second DL transmission resource, a second downlink signal and second downlink data that are sent by the network device.

The processing module 1602 is further configured to obtain first channel information based on the second downlink signal and the second downlink data, where the first channel information includes downlink direct channel information and downlink cascading channel information.

The sending module 1603 is further configured to send the first channel information to the network device by using the second UL transmission resource.

In a possible implementation, the second UL transmission resource further includes PUSCH resource information configured by the network device for the apparatus, and a PUSCH resource is used to transmit the first channel information.

In a possible implementation, the first flexible symbol to the $(1+i)^{th}$ flexible symbol in the flexible slot are used to transmit the resource indication information, where i is a natural number.

Optionally, a value of i is determined by the network device based on one or more of the following items: a quantity of antennas of the network device, a quantity of antennas of the resource allocation apparatus 1600, a quantity of resource allocation apparatuses 1600, a quantity of IRS arrays, and a quantity of reflection units in the IRS array.

Optionally, the resource allocation apparatus 1600 shown in FIG. 16 may further include a storage module (not shown in FIG. 16). The storage module stores a program or instructions. When the processing module 1602 executes the program or the instructions, the resource allocation apparatus 1600 shown in FIG. 16 may perform the resource allocation method shown in FIG. 8.

For technical effects of the resource allocation apparatus 1600 shown in FIG. 16, refer to the technical effects of the resource allocation method shown in FIG. 8. Details are not described herein again.

The processing module in the resource allocation apparatus 1600 shown in FIG. 16 may be implemented by a processor or a processor-related circuit component, and may be a processor or a processing unit.

The receiving module 1601 and the sending module 1603 may be collectively referred to as a transceiver module, may be implemented by a transceiver or a transceiver-related circuit component, and may be a transceiver or a transceiver unit.

Operations and/or functions of the modules in the resource allocation apparatus 1600 are respectively used to implement corresponding procedures of the resource allocation method shown in FIG. 8. For brevity, details are not described herein again.

Figure 17:
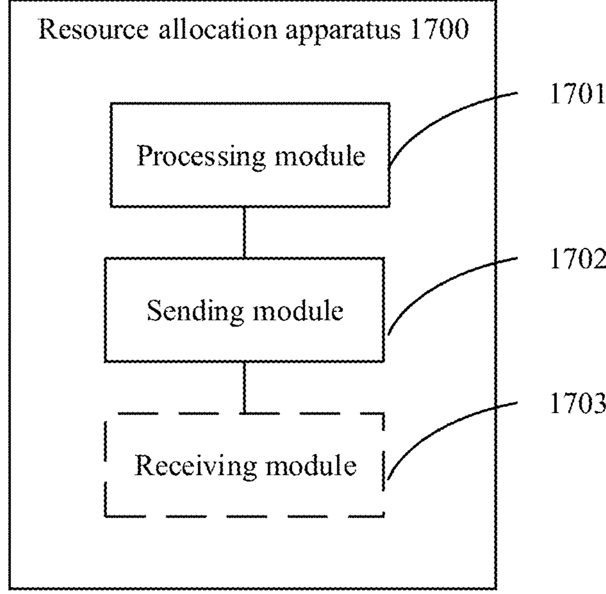
FIG. 17 is a schematic structural diagram 2 of a resource apparatus according to an embodiment of this disclosure.

For example, FIG. 17 is a schematic structural diagram 2 of a resource allocation apparatus according to an embodiment of this disclosure. As shown in FIG. 17, a resource allocation apparatus 1700 includes a processing module 1701 and a sending module 1702. The resource allocation apparatus 1700 may be configured to implement functions of the network device in the foregoing method embodiments. The resource allocation apparatus 1700 may be an independent network device, for example, a base station, or may be a chip or a chip system included in the network device.

The processing module 1701 is configured to determine resource indication information.

Optionally, the resource indication information indicates an UL transmission resource and a DL transmission resource in a flexible slot, and the flexible slot is used to determine an intelligent reflecting surface IRS array control parameter.

The sending module 1702 is configured to send the resource indication information to a terminal device.

In a possible implementation, an uplink cascading channel and a downlink cascading channel between the resource allocation apparatus 1700 and the terminal device have reciprocity.

Optionally, the resource indication information includes first indication information, the first indication information includes first resource configuration information, the first resource configuration information is used to configure a first UL transmission resource and a first DL transmission resource, the first UL transmission resource includes a first time period, the first DL transmission resource includes a second time period, the first time period is earlier than the second time period, and a quantity of symbols included in the first time period and a quantity of symbols included in the second time period are the same or different.

In a possible implementation, the first indication information further includes a first IRS array control parameter.

Optionally, the resource allocation apparatus 1700 further includes a receiving module 1703.

The receiving module 1703 is configured to receive, by using the first UL transmission resource, an uplink reference signal reflected by an IRS array based on the first IRS array control parameter.

The processing module 1701 is further configured to obtain a second IRS array control parameter based on the uplink reference signal.

The sending module 1702 is further configured to send the second IRS array control parameter to the IRS array by using the first DL transmission resource, so that the IRS array performs UL transmission and DL transmission based on the second IRS array control parameter.

In a possible implementation, an uplink cascading channel and a downlink cascading channel between the resource allocation apparatus 1700 and the terminal device have no reciprocity.

Optionally, the resource indication information includes second indication information, the second indication information includes second resource configuration information, the second resource configuration information is used to configure a second DL transmission resource and a second UL transmission resource, the second DL transmission resource includes a third time period, the second UL transmission resource includes a fourth time period, the third time period is earlier than the fourth time period, and a quantity of symbols included in the third time period and a quantity of symbols included in the fourth time period are the same or different.

In a possible implementation, the resource allocation apparatus 1700 further includes a receiving module.

The receiving module 1703 is configured to receive request information sent by a target terminal device. The request information is used to request to participate in a process of determining the IRS array control parameter. The target terminal device is at least one device in the terminal device.

In a possible implementation, the sending module 1702 is further configured to send a downlink signal and downlink data to the target terminal device by using the second DL transmission resource.

The receiving module 1703 is further configured to receive, by using the second UL transmission resource, first channel information sent by the target terminal device, where the first channel information is channel information that is obtained by the target terminal device based on the downlink signal and the downlink data, and the first channel information includes downlink direct channel information and downlink cascading channel information.

In a possible implementation, the second UL transmission resource further includes PUSCH resource information configured by the apparatus for the target terminal device, and a PUSCH resource is used to transmit the first channel information.

In a possible implementation, the first flexible symbol to the $(1+i)^{th}$ flexible symbol in the flexible slot are used to transmit the resource indication information, where i is a natural number.

A value of i is determined by the resource allocation apparatus 1700 based on one or more of the following items: a quantity of antennas of the resource allocation apparatus 1700, a quantity of antennas of the terminal device or the target terminal device, a quantity of terminal devices or target terminal devices, a quantity of IRS arrays, and a quantity of reflection units in the IRS array.

In a possible implementation, the processing module 1701 is further configured to determine whether an uplink cascading channel and a downlink cascading channel between the apparatus and the terminal device have reciprocity.

In a possible implementation, the processing module 1701 is configured to preset that the uplink cascading channel and the downlink cascading channel between the resource allocation apparatus 1700 and the terminal device have no reciprocity. Alternatively, the resource allocation apparatus 1700 determines, based on position information of the terminal device, whether the uplink cascading channel and the downlink cascading channel between the resource allocation apparatus 1700 and the terminal device have reciprocity.

Optionally, the resource allocation apparatus 1700 shown in FIG. 17 may further include a storage module (not shown in FIG. 17). The storage module stores a program or instructions. When the processing module 1701 executes the program or the instructions, the resource allocation apparatus 1700 shown in FIG. 17 may perform the resource allocation method shown in FIG. 8.

For technical effects of the resource allocation apparatus 1700 shown in FIG. 17, refer to the technical effects of the resource allocation method shown in FIG. 8. Details are not described herein again.

The processing module in the resource allocation apparatus 1700 shown in FIG. 17 may be implemented by a processor or a processor-related circuit component, and may be a processor or a processing unit.

The receiving module 1703 and the sending module 1702 may be collectively referred to as a transceiver module, may be implemented by a transceiver or a transceiver-related circuit component, and may be a transceiver or a transceiver unit.

Operations and/or functions of the modules in the resource allocation apparatus 1700 are respectively used to implement corresponding procedures of the resource allocation method shown in FIG. 8. For brevity, details are not described herein again.

Figure 18:
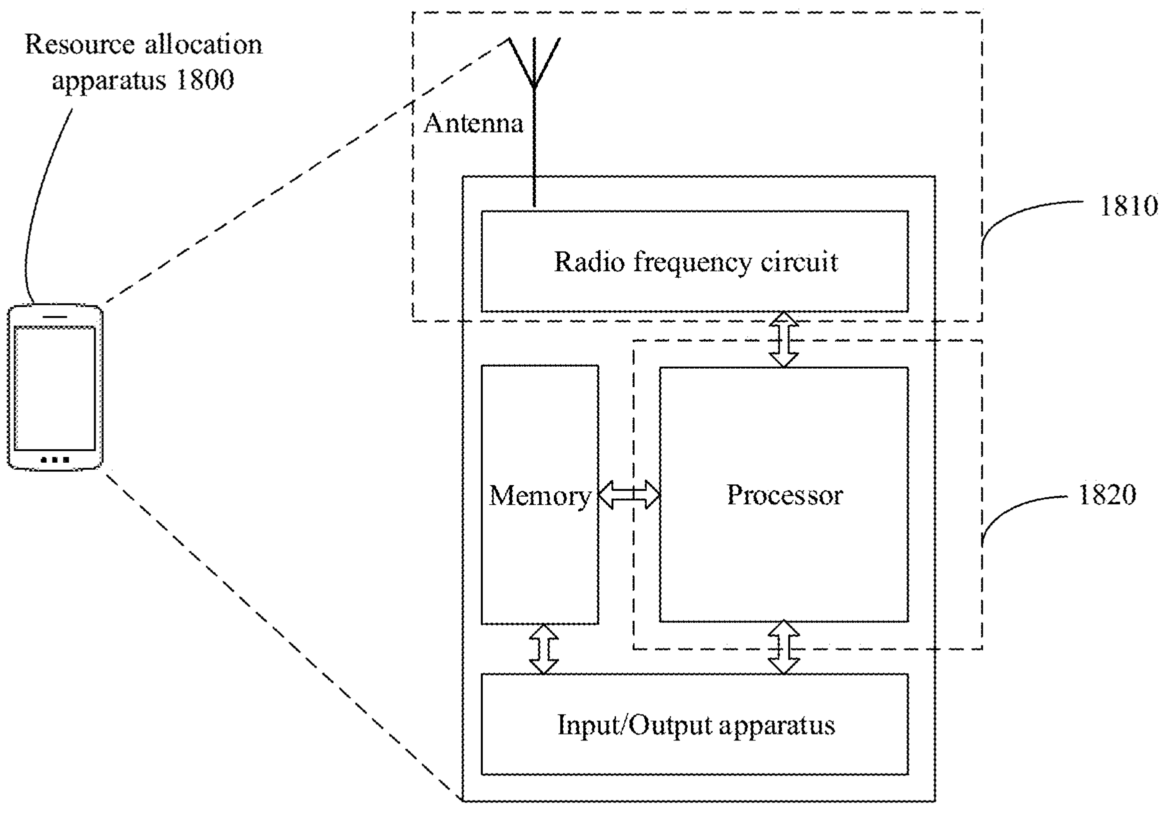
FIG. 18 is a schematic structural diagram 3 of a resource apparatus according to an embodiment of this disclosure.

FIG. 18 is a schematic structural diagram 3 of a resource allocation apparatus according to an embodiment of this disclosure. As shown in FIG. 18, the resource allocation apparatus 1800 may be a terminal device. For ease of understanding and ease of illustration, in FIG. 18, a mobile phone is used as an example for the terminal device.

As shown in FIG. 18, the resource allocation apparatus 1800 includes a processor, may further include a memory, and certainly, may further include a radio frequency circuit, an antenna, an input/output apparatus, and the like.

The processor is configured to process a communication protocol and communication data, control the resource allocation apparatus 1800, execute a software program, process data of the software program, and the like. The memory is configured to store the software program and the data. The radio frequency circuit is configured to perform conversion between a baseband signal and a radio frequency signal and process the radio frequency signal. The antenna is configured to receive and send radio frequency signals in a form of an electromagnetic wave. The input/output apparatus, for example, a touchscreen, a display, or a keyboard, is configured to receive data entered by a user and output data to the user. It should be noted that some types of resource allocation apparatus 1800 may not have an input/output apparatus.

When data needs to be sent, the processor performs baseband processing on the to-be-sent data, and then outputs a baseband signal to the radio frequency circuit. The radio frequency circuit performs radio frequency processing on the baseband signal and then sends a radio frequency signal to the outside in a form of an electromagnetic wave through the antenna. When data is sent to the resource allocation apparatus 1800, the radio frequency circuit receives a radio frequency signal through the antenna, converts the radio frequency signal into a baseband signal, and outputs the baseband signal to the processor. The processor converts the baseband signal into data, and processes the data.

For ease of description, only one memory and one processor are shown in FIG. 18. In an actual resource allocation device 1800, there may be one or more processors and one or more memories. The memory may also be referred to as a storage medium, a storage device, or the like. The memory may be disposed independent of the processor, or may be integrated with the processor. This is not limited to some embodiments.

In some embodiments, the antenna and the radio frequency circuit having a transceiver function may be considered as a transceiver unit 1810 of the resource allocation apparatus 1800, and the processor having a processing function may be considered as a processing unit 1820 of the resource allocation apparatus 1800.

As shown in FIG. 18, the resource allocation apparatus 1800 includes the transceiver unit 1810 and the processing unit 1820. The transceiver unit 1810 may also be referred to as a transceiver, a transceiver machine, a transceiver apparatus, a transceiver circuit, or the like. The processing unit 1820 may also be referred to as a processor, a processing board, a processing module, a processing apparatus, or the like. Optionally, a component that is in the transceiver unit 1810 and that is configured to implement a receiving function may be considered as a receiving unit, and a component that is in the transceiver unit 1810 and that is configured to implement a sending function may be considered as a sending unit. In other words, the transceiver unit 1810 includes a receiving unit and a sending unit. The receiving unit sometimes may also be referred to as a receiver machine, a receiver, a receiving apparatus, a receiver circuit, or the like. The sending unit sometimes may also be referred to as a transmitter, a transmitter machine, a transmitter apparatus, a transmitter circuit, or the like.

It should be understood that the transceiver unit 1810 is configured to perform a sending operation and a receiving operation on a terminal device side in the foregoing method embodiments, and the processing unit 1820 is configured to perform other operations on the terminal device than the sending and receiving operations in the foregoing method embodiments.

For example, in a possible implementation, the transceiver unit 1810 is configured to perform a receiving operation on the terminal device side in step S802 and step S803 in FIG. 8, and/or the transceiver unit 1810 is further configured to perform other receiving and sending steps on the terminal device side in embodiments of this disclosure. The processing unit 1820 is configured to perform step S804 in FIG. 8, and/or the processing unit 1820 is further configured to perform another processing step on the terminal device side in embodiments of this disclosure.

For another example, in another implementation, the transceiver unit 1810 is configured to perform a sending operation on the terminal device side in step S1401 in FIG. 14, and/or the transceiver unit 1810 is further configured to perform other sending and receiving steps on the terminal device side in embodiments of this disclosure. The processing unit 1820 is configured to perform another processing step on the terminal device side in embodiments of this disclosure.

For still another example, in still another implementation, the transceiver unit 1810 is configured to perform a receiving operation on the terminal device side in step S1501 in FIG. 15, and/or a sending operation on the terminal device side in step S1503, and/or the transceiver unit 1810 is further configured to perform other sending and receiving steps on the terminal device side in embodiments of this disclosure. The processing unit 1820 is configured to perform step S1502 in FIG. 15, and/or the processing unit 1820 is further configured to perform another processing step on the terminal device side in embodiments of this disclosure.

When the resource allocation apparatus 1800 is a chip apparatus or a chip circuit, the resource allocation apparatus 1800 may include a transceiver unit and a processing unit. The transceiver unit may be an input/output circuit and/or a communication interface. The processing unit is an integrated processor, a microprocessor, or an integrated circuit.

Figure 19:
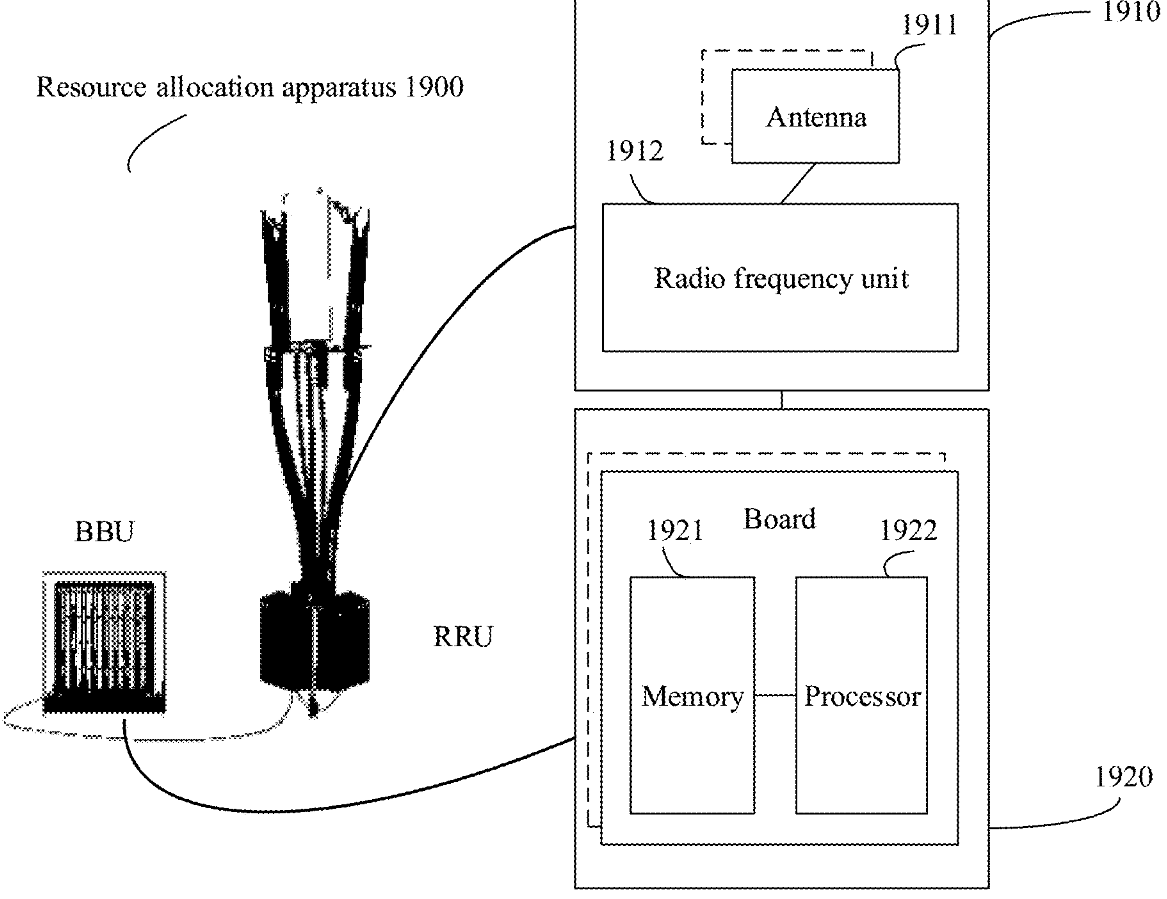
FIG. 19 is a schematic structural diagram 4 of a resource apparatus according to an embodiment of this disclosure.

FIG. 19 is a schematic structural diagram 4 of a resource allocation apparatus according to an embodiment of this disclosure. As shown in FIG. 19, the resource allocation apparatus 1900 may be a network device. For ease of understanding and ease of illustration, in FIG. 19, a base station is used as an example for the network device.

As shown in FIG. 19, the resource allocation apparatus 1900 includes one or more radio frequency units, such as a RRU 1910 and one or more BBUs (also referred to as a digital unit (DU)) 1920.

The RRU 1910 may be referred to as a transceiver module, and is corresponding to the sending module 1702 and the receiving module 1703 in FIG. 17. Optionally, the transceiver module may also be referred to as a transceiver, a transceiver circuit, a transceiver machine, or the like, and may include at least one antenna 1911 and a radio frequency unit 1912. The RRU 1910 part is configured to: send and receive a radio frequency signal and perform conversion between a radio frequency signal and a baseband signal, for example, configured to send downlink data and/or a downlink signal to a terminal device. The BBU 1920 part is configured to perform baseband processing, control the base station, and the like. The RRU 1910 and the BBU 1920 may be physically disposed together, or may be physically disposed separately, that is, a distributed base station.

The BBU 1920 is a control center of the base station, and may also be referred to as a processing module. The BBU 1920 may correspond to the processing module 1701 in FIG. 17, and is configured to implement a baseband processing function, such as channel coding, multiplexing, modulation, and spreading. For example, the BBU (the processing module) may be configured to control the base station to perform an operation procedure related to the network device in the foregoing method embodiments, for example, determine an IRS array control parameter.

In an example, the BBU 1920 may include one or more boards. A plurality of boards may jointly support a radio access network (such as an LTE network) of a single access standard, or may separately support radio access networks (such as an LTE network, a 5G network, or another network) of different access standards.

The BBU 1920 further includes a memory 1921 and a processor 1922. The memory 1921 is configured to store necessary instructions and data. The processor 1922 is configured to control the base station to perform a necessary action, for example, configured to control the base station to perform an operation procedure related to the network device in the foregoing method embodiments. The memory 1921 and the processor 1922 may serve one or more boards. In other words, the memory and the processor may be deployed on each board. Alternatively, a plurality of boards may share a same memory and a same processor. In addition, a necessary circuit may be further disposed on each board.

For example, in a possible implementation, the RRU 1910 is configured to perform a sending operation on a network device side in step S802 in FIG. 8, and/or the RRU 1910 is further configured to perform other receiving and sending steps on the network device side in embodiments of this disclosure. The BBU 1920 is configured to perform step S801 in FIG. 8, and/or the BBU 1920 is further configured to perform another processing step on the network device side in embodiments of this disclosure.

For another example, in another implementation, the RRU 1910 is configured to perform a sending operation on the network device side in step S1403 in FIG. 14, and/or the RRU 1910 is further configured to perform other receiving and sending steps on the network device side in embodiments of this disclosure. The BBU 1920 is configured to perform an operation on the network device side in step S1402 in FIG. 14, and/or the BBU 1920 is further configured to perform another processing step on the network device side in embodiments of this disclosure.

For still another example, in still another implementation, the RRU 1910 is configured to perform a sending operation on the network device side in step S1501 in FIG. 15, and/or a receiving operation on the network device side in step S1503, and/or the RRU 1910 is further configured to perform other receiving and sending steps on the network device side in embodiments of this disclosure. The BBU 1920 is configured to perform step S1504 in FIG. 15, and/or the BBU 1920 is further configured to perform another processing step on the network device side in embodiments of this disclosure.

When the resource allocation apparatus 1900 is a chip apparatus or a chip circuit, the resource allocation apparatus 1900 may include an RRU and a BBU. The RRU may be an input/output circuit and/or a communication interface. The BBU is an integrated processor, a microprocessor, or an integrated circuit.

Figure 20:
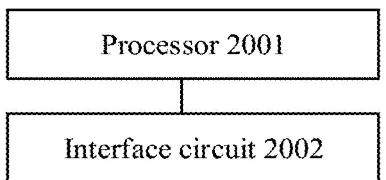
FIG. 20 is a schematic structural diagram 5 of a resource apparatus according to an embodiment of this disclosure.

FIG. 20 is a schematic structural diagram 5 of a resource allocation apparatus according to an embodiment of this disclosure. The resource allocation apparatus may be used for a terminal device or a network device.

As shown in FIG. 20, the resource allocation apparatus includes at least one processor 2001 and at least one interface circuit 2002. The processor 2001 and the interface circuit 2002 may be interconnected by using a line. For example, the interface circuit 2002 may be configured to receive a signal from another apparatus. For another example, the interface circuit 2002 may be configured to send a signal to another apparatus (for example, the processor 2001). For example, the interface circuit 2002 may read instructions stored in the memory, and send the instructions to the processor 2001. When the instructions are executed by the processor 2001, the resource allocation apparatus may perform steps in the feedback information receiving method in the foregoing embodiments. Certainly, the resource allocation apparatus may further include another discrete component. This is not limited to some embodiments.

An embodiment of this disclosure provides a communication apparatus. The communication apparatus includes a logical circuit, an input interface, and an output interface.

In some embodiments, the communication apparatus is used for a terminal device. The input interface is configured to receive resource indication information sent by a network device, and/or is further configured to perform another receiving step on a terminal device side in embodiments of this disclosure. The logical circuit is configured to: configure a UL resource and a DL resource in a flexible slot based on the resource indication information; and/or measure downlink channel information based on downlink data and a downlink signal; and/or is further configured to perform another processing step on the terminal device side in embodiments of this disclosure. The output interface is configured to send an uplink reference signal to the network device, and/or is further configured to perform another sending step on the terminal device side in embodiments of this disclosure.

In some other embodiments, the communication apparatus is used for a network device. The input interface is configured to receive an uplink reference signal sent by a terminal device, and/or is further configured to perform another receiving step on a network device side in embodiments of this disclosure. The logical circuit is configured to determine resource indication information, and/or is further configured to perform another processing step on the network device side in embodiments of this disclosure. The output interface is configured to send the resource indication information to the terminal device, and/or is further configured to perform another sending step on the network device side in embodiments of this disclosure.

The input interface and the output interface may be collectively referred to as an input/output interface, a transceiver interface, or a communication interface, may be implemented by a transceiver or a transceiver-related circuit component, and may be a transceiver or a transceiver unit.

An embodiment of this disclosure further provides a chip system, including a processor. The processor is coupled to a memory, the memory is configured to store a program or instructions, and when the program or the instructions are executed by the processor, the chip system is enabled to implement the method in any one of the foregoing method embodiments.

Optionally, there may be one or more processors in the chip system. The processor may be implemented by using hardware, or may be implemented by using software. When the processor is implemented by the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this disclosure. For example, the memory may be a non-transitory processor, for example, a ROM. The memory and the processor may be integrated into a same chip, or may be separately disposed on different chips. A type of the memory and a manner of disposing the memory and the processor are not limited in this disclosure.

For example, the chip system may be a FPGA, an ASIC, a system on a chip (SoC), a CPU, a network processor (NP), a digital signal processor (DSP), a micro controller unit (MCU), a programmable logic device (PLD), or another integrated chip.

It should be understood that the steps in the foregoing method embodiments may be completed by using an integrated logical circuit of hardware in the processor or by using instructions in a form of software. The steps of the method disclosed with reference to embodiments of this disclosure may be directly performed by a hardware processor, or may be performed by a combination of hardware and software modules in the processor.

An embodiment of this disclosure further provides a computer-readable storage medium, configured to store computer software instructions used by the foregoing communication apparatus.

An embodiment of this disclosure further provides a computer program product, for example, a computer-readable storage medium, including a program designed for performing steps performed by the communication apparatus in the foregoing embodiments.

Method or algorithm steps described in combination with the content disclosed in this disclosure may be implemented by hardware, or may be implemented by a processor by executing software instructions. The software instructions may include a corresponding software module. The software module may be stored in a RAM, a flash memory, a ROM, an EPROM, an EEPROM, a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be disposed in an ASIC. In addition, the ASIC may be located in a core network interface device. Certainly, the processor and the storage medium may exist in the core network interface device as discrete components.

In the several embodiments provided in this disclosure, it should be understood that the disclosed method and apparatus may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network device. Some or all of the units may be selected based on actual requirements to achieve the objectives of the solutions of embodiments.

In addition, functional units in embodiments of the present disclosure may be integrated into one processing unit, or each of the functional units may exist independently, or two or more units are integrated into one unit. The integrated unit may be implemented in a form of hardware, or may be implemented in a form of hardware in addition to a software functional unit.

When the integrated unit is implemented in the form of a software functional unit and sold or used as an independent product, the integrated unit may be stored in a computer-readable storage medium. Based on such an understanding, the technical solutions of this disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in embodiments of this disclosure. The foregoing storage medium includes any medium that can store program code, such as a USB flash drive, a removable hard disk, a ROM, a RAM, a magnetic disk, or an optical disc.

Based on the foregoing descriptions of the implementations, a person skilled in the art may clearly understand that the present disclosure may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in embodiments of the present disclosure.

The foregoing descriptions are merely specific implementations of this disclosure, but are not intended to limit the protection scope of this disclosure. Any variation or replacement within the technical scope disclosed in this disclosure shall fall within the protection scope of this disclosure. Therefore, the protection scope of this disclosure shall be subject to the protection scope of the claims.

What is claimed is:

1. A resource allocation method, wherein the method comprises:

obtaining, by a communication apparatus, resource indication information, wherein the resource indication information indicates an uplink (UL) transmission resource and a downlink (DL) transmission resource in a flexible slot, and the flexible slot is a time-domain resource during which an intelligent reflecting surface (IRS) array control parameter is configured; and performing, by the communication apparatus, UL transmission and DL transmission based on the resource indication information.

2. The method according to claim 1, wherein an uplink cascading channel and a downlink cascading channel between the communication apparatus and a network device have reciprocity, the resource indication information comprises indication information, the indication information comprises resource configuration information, the resource configuration information is used to configure the UL transmission resource and the DL transmission resource, the UL transmission resource comprises a first time period, the DL transmission resource comprises a second time period, and the first time period is earlier than the second time period.

3. The method according to claim 2, wherein the indication information further comprises a first IRS array control parameter, and the method further comprises:

sending, by the communication apparatus, an uplink reference signal to the network device by using the UL transmission resource, so that the network device obtains a second IRS array control parameter based on the first IRS array control parameter and the uplink reference signal; and receiving, by the communication apparatus by using the DL transmission resource, at least one of a downlink signal or downlink data that is reflected by an IRS array based on the second IRS array control parameter.

4. The method according to claim 1, wherein an uplink cascading channel and a downlink cascading channel between the communication apparatus and a network device have no reciprocity, the resource indication information comprises indication information, the indication information comprises resource configuration information, the resource configuration information is used to configure a DL transmission resource and a UL transmission resource, the DL transmission resource comprises a first time period, the first UL transmission resource comprises a second time period, and the first time period is earlier than the second time period.

5. The method according to claim 4, wherein the method further comprises:

sending, by a target terminal device, request information to the network device, wherein the request information is used to request to participate in a process of determining the IRS array control parameter, and the target terminal device is at least one device in the communication apparatus.

6. The method according to claim 5, wherein the method further comprises:

receiving, by the target terminal device by using the DL transmission resource, a downlink signal and downlink data that are sent by the network device;

obtaining, by the target terminal device, channel information based on the downlink signal and the downlink data, wherein the channel information comprises downlink direct channel information and downlink cascading channel information; and sending, by the target terminal device, the channel information to the network device by using the UL transmission resource.

7. The method according to claim 6, wherein the UL transmission resource further comprises physical uplink shared channel (PUSCH) resource configured by the network device for the target terminal device, and the PUSCH resource is used to transmit the channel information.

8. The method according to claim 1, wherein a first flexible symbol to a $(1+i)^{th}$ flexible symbol in the flexible slot are used to transmit the resource indication information, wherein i is a natural number, and a value of i is determined by the network device based on one or more of the following items: a quantity of antennas of the network device, a quantity of antennas of the communication apparatus or the target terminal device, a quantity of terminal devices or target terminal devices, a quantity of IRS arrays, or a quantity of reflection units in the IRS array.

9. A resource allocation method, wherein the method comprises:

determining, by a communication apparatus, resource indication information, wherein the resource indication information indicates an uplink (UL) transmission resource and a downlink (DL) transmission resource in a flexible slot, and the flexible slot is a time domain resource during which an intelligent reflecting surface (IRS) array control parameter is configured; and sending, by the communication apparatus, the resource indication information to a terminal device.

10. The method according to claim 9, wherein an uplink cascading channel and a downlink cascading channel between the communication apparatus and the terminal device have reciprocity, the resource indication information comprises indication information, the indication information comprises resource configuration information, the resource configuration information is used to configure a UL transmission resource and a DL transmission resource, the UL transmission resource comprises a first time period, the DL transmission resource comprises a second time period, and the first time period is earlier than the second time period.

11. The method according to claim 10, wherein the indication information further comprises a first IRS array control parameter, and the method further comprises:

receiving, by the communication apparatus by using the UL transmission resource, an uplink reference signal reflected by an IRS array based on the first IRS array control parameter, and obtaining a second IRS array control parameter based on the uplink reference signal; and sending, by the communication apparatus, the second IRS array control parameter to the IRS array by using the DL transmission resource, so that the IRS array performs UL transmission and DL transmission based on the second IRS array control parameter.

12. The method according to claim 9, wherein an uplink cascading channel and a downlink cascading channel between the communication apparatus and the terminal device have no reciprocity, the resource indication information comprises indication information, the indication information comprises resource configuration information, the resource configuration information is used to configure a DL transmission resource and a UL transmission resource, the DL transmission resource comprises a first time period, the UL transmission resource comprises a fourth time period, and the first time period is earlier than the fourth time period.

13. The method according to claim 12, wherein the method further comprises:

receiving, by the communication apparatus, request information sent by a target terminal device, wherein the request information is used to request to participate in a process of determining the IRS array control parameter, and the target terminal device is at least one device in the terminal device.

14. The method according to claim 13, wherein the method further comprises:

sending, by the communication apparatus, a downlink signal and downlink data to the target terminal device by using the DL transmission resource; and receiving, by the communication apparatus by using the UL transmission resource, channel information sent by the target terminal device, wherein the channel information is obtained by the target terminal device based on the downlink signal and the downlink data, and the channel information comprises downlink direct channel information and downlink cascading channel information.

15. The method according to claim 12, wherein the UL transmission resource further comprises physical uplink shared channel (PUSCH) resource configured by the communication apparatus for the target terminal device, and the PUSCH resource is used to transmit the first channel information.

16. The method according to claim 9, wherein a first flexible symbol to a $(1+i)^{th}$ flexible symbol in the flexible slot are used to transmit the resource indication information, wherein i is a natural number, and a value of i is determined by the communication apparatus based on one or more of the following items: a quantity of antennas of the communication apparatus, a quantity of antennas of the terminal device or the target terminal device, a quantity of terminal devices or target terminal devices, a quantity of IRS arrays, or a quantity of reflection units in the IRS array.

17. The method according to claim 9, wherein before the determining, by the communication apparatus, resource indication information, the method further comprises:

determining, by the communication apparatus, whether an uplink cascading channel and a downlink cascading channel between the communication apparatus and the terminal device have reciprocity.

18. The method according to claim 17, wherein the determining, by the communication apparatus, whether an uplink cascading channel and a downlink cascading channel between the communication apparatus and the terminal device have reciprocity comprises:

presetting, by the communication apparatus, that the uplink cascading channel and the downlink cascading channel between the communication apparatus and the terminal device have no reciprocity; or determining, by the communication apparatus based on position information of the terminal device, whether the uplink cascading channel and the downlink cascading channel between the communication apparatus and the terminal device have reciprocity.

19. A resource allocation apparatus, comprises at least one memory, configured to store instructions; and at least one processor, wherein when executing the instructions, the at least one processor is configured to:

obtain resource indication information, wherein the resource indication information indicates an uplink (UL) transmission resource and a downlink (DL) transmission resource in a flexible slot, and the flexible slot is a time-domain resource during which an intelligent reflecting surface (IRS) array control parameter is configured; and perform UL transmission and DL transmission based on the resource indication information.

20. The apparatus according to claim 19, wherein an uplink cascading channel and a downlink cascading channel between the apparatus and a network device have no reciprocity, the resource indication information comprises indication information, the indication information comprises resource configuration information, the resource configuration information is used to configure the DL transmission resource and the UL transmission resource, the DL transmission resource comprises a first time period, the UL transmission resource comprises a second time period, and the first time period is earlier than the second time period.

* * * * *